(12) United States Patent  
Jang et al.

(10) Patent No.: US 9,420,279 B2  
(45) Date of Patent: Aug. 16, 2016

(54) RATE CONTROL METHOD FOR MULTI-LAYERED VIDEO CODING, AND VIDEO ENCODING APPARATUS AND VIDEO SIGNAL PROCESSING APPARATUS USING THE RATE CONTROL METHOD

(71) Applicant: SAMSUNG ELECTRONICS CO., LTD., Suwon-si, Gyeonggi-do (KR)

(72) Inventors: Hyuk-jae Jang, Gyeonggi-do (KR); Nyeong-kyu Kwon, Daejeon (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 661 days.

(21) Appl. No.: 13/798,371

(22) Filed: Mar. 13, 2013

(65) Prior Publication Data

US 2013/0322524 A1    Dec. 5, 2013

(30) Foreign Application Priority Data

Jun. 1, 2012   (KR) .................. 10-2012-0059428

(51) Int. Cl.
*H04N 19/34*   (2014.01)
*H04N 19/115*   (2014.01)
(Continued)

(52) U.S. Cl.
CPC ......... *H04N 19/0006* (2013.01); *H04N 19/115* (2014.11); *H04N 19/15* (2014.11); *H04N 19/167* (2014.11); *H04N 19/187* (2014.11); *H04N 19/30* (2014.11)

(58) Field of Classification Search
CPC . H04N 19/0006; H04N 19/115; H04N 19/15; H04N 19/167; H04N 19/187; H04N 19/30; H04N 19/34; H04N 19/36; H04N 21/234327; H04N 19/117; H04N 19/127; H04N 19/13; H04N 19/132; H04N 19/136; H04N 19/149; H04N 19/164; H04N 19/172; H04N 19/177; H04N 19/31; H04N 19/46; H04N 19/517; H04N 19/577; H04N 19/587; H04N 19/59; H04N 19/61; H04N 19/615; H04N 19/63; H04N 19/70; H04N 19/86; H04N 21/4108
USPC ....................................... 375/240.01–240.29
See application file for complete search history.

(56) References Cited

U.S. PATENT DOCUMENTS 6,057,884 A * 5/2000 Chen ...................... H04N 7/52  
                                                        348/42  
6,363,119 B1 3/2002 Oami  
(Continued)

FOREIGN PATENT DOCUMENTS

JP    2011-029962    2/2011  
WO   2005/039184   4/2005

*Primary Examiner* — Sath V Perungavoor  
*Assistant Examiner* — Nathnael Aynalem  
(74) *Attorney, Agent, or Firm* — F. Chau & Associates, LLC

(57) ABSTRACT

A rate control method for multi-layered video coding, a video encoding apparatus and a video signal processing system employing the rate control method. In the rate control method for multi-layered video coding, encoding statistical information is generated based on the result of encoding input video data on a first layer. A second rate controller generates a plurality of quantization parameters to be used when encoding is performed on a second layer, based on the encoding statistical information and/or region of interest (ROI) information. Target numbers of bits that are to be respectively assigned to regions of a second layer are determined based on the encoding statistical information and/or ROI information, and the input video data is encoded at the second layer, based on the target numbers of bits.

25 Claims, 26 Drawing Sheets

(51) Int. Cl.
*H04N 19/30* (2014.01)
*H04N 19/15* (2014.01)
*H04N 19/187* (2014.01)
*H04N 19/167* (2014.01)

(56) References Cited

U.S. PATENT DOCUMENTS

| | | |
|---|---|---|
| 8,085,679 B2 | 12/2011 | Lee |
| 2006/0262985 A1 | 11/2006 | Chen et al. |
| 2007/0116126 A1* | 5/2007 | Haskell ............... H04N 19/196 375/240.21 |
| 2008/0089424 A1 | 4/2008 | Karczewicz et al. |
| 2008/0165848 A1 | 7/2008 | Ye et al. |
| 2009/0067493 A1 | 3/2009 | Jun et al. |
| 2010/0158127 A1 | 6/2010 | Kim et al. |
| 2011/0038421 A1 | 2/2011 | Schwarz et al. |
| 2013/0028316 A1* | 1/2013 | Leontaris ............. H04N 19/597 375/240.03 |
| 2013/0182073 A1* | 7/2013 | Yin .................... H04N 13/0048 348/43 |

* cited by examiner

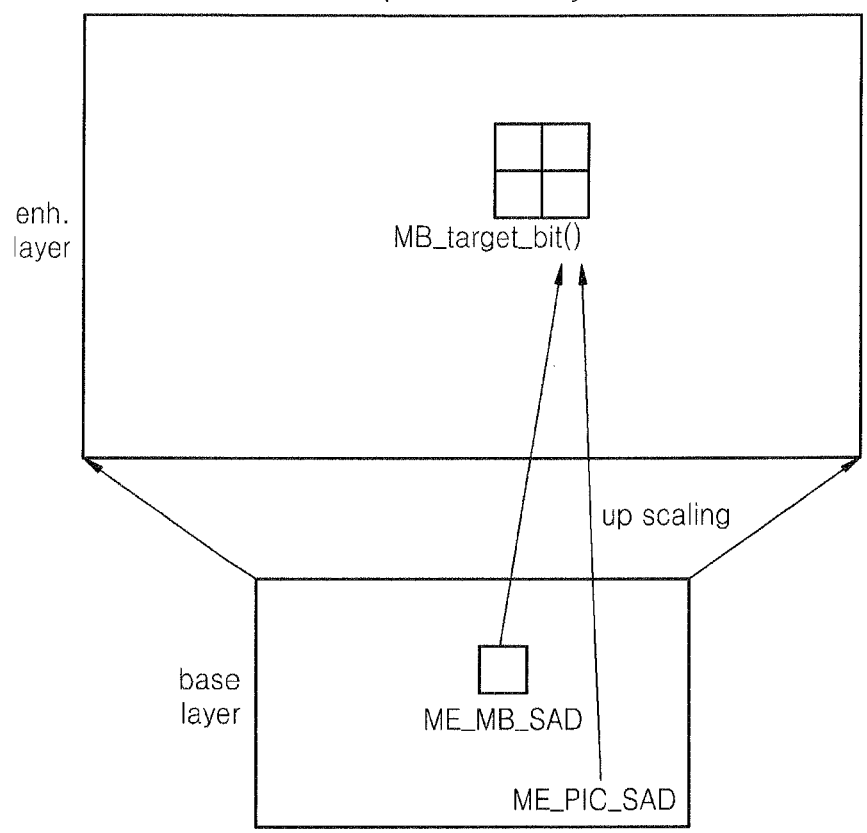

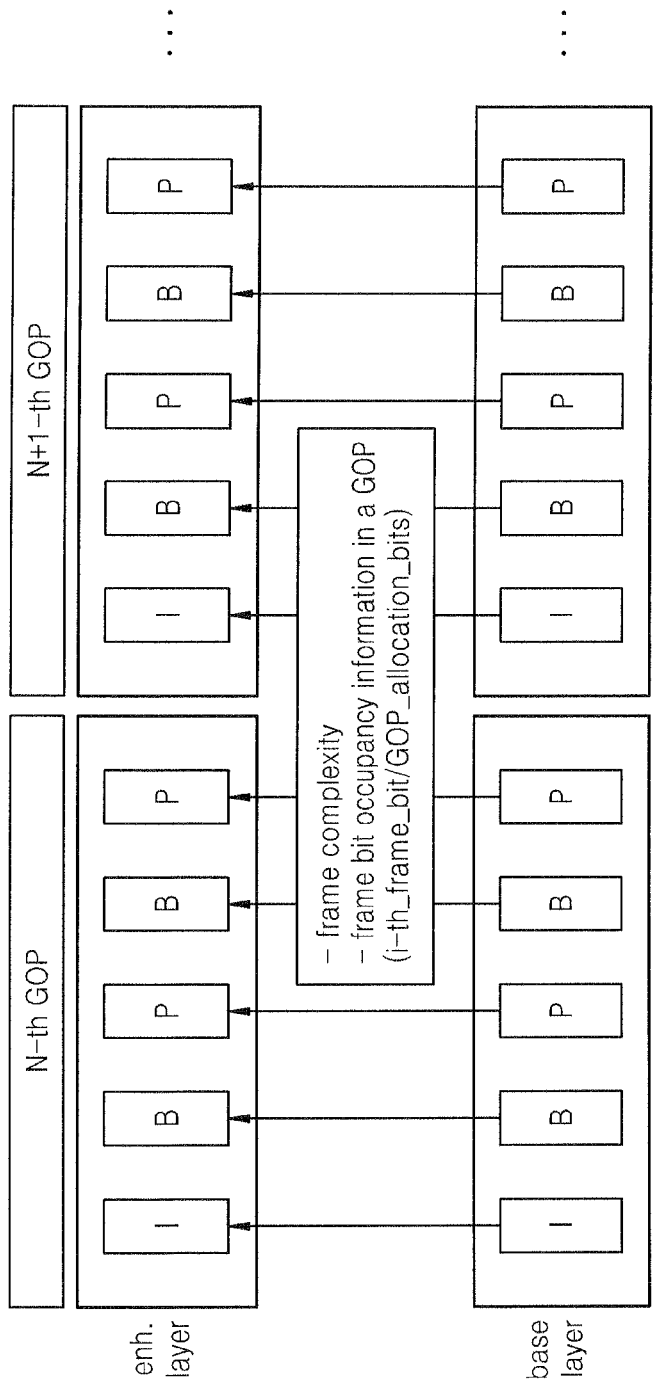

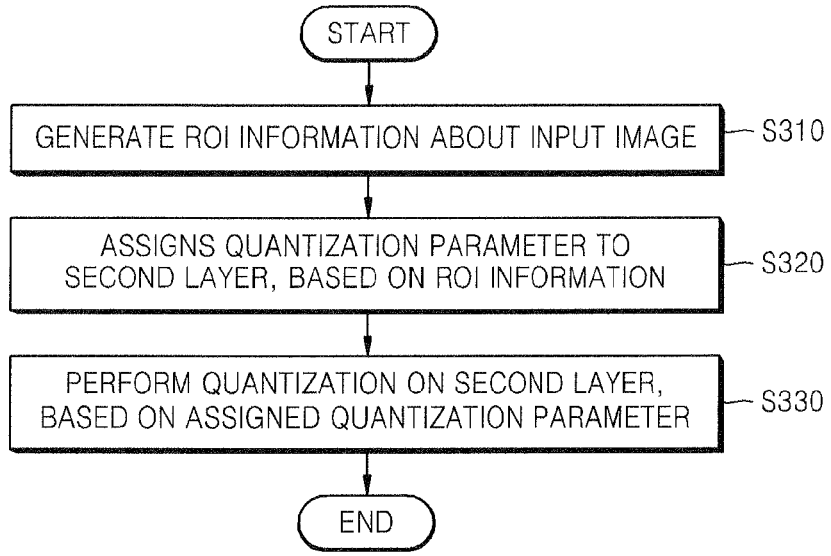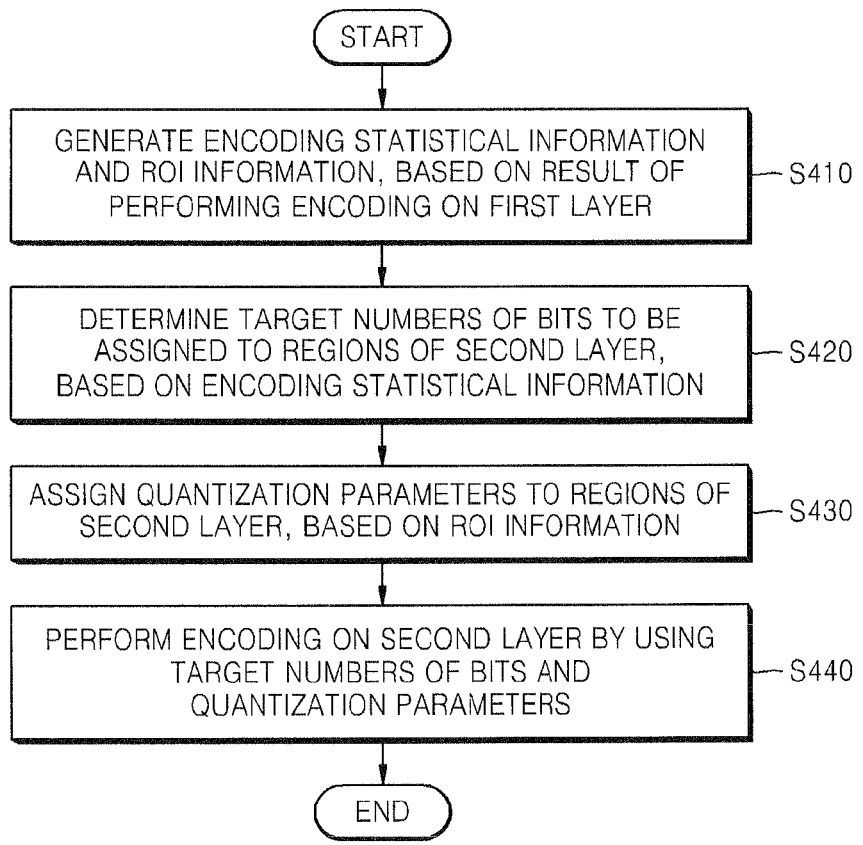

RATE CONTROL METHOD FOR MULTI-LAYERED VIDEO CODING, AND VIDEO ENCODING APPARATUS AND VIDEO SIGNAL PROCESSING APPARATUS USING THE RATE CONTROL METHOD

CROSS-REFERENCE TO RELATED APPLICATIONS

This application claims the benefit of Korean Patent Application No. 10-2012-0059428, filed on Jun. 1, 2012, in the Korean Intellectual Property Office, which is incorporated by reference herein in its entirety.

TECHNICAL FIELD

One or more aspects of the inventive concept relate to a signal processing apparatus and method, and more particularly, to a rate control method for multi-layered video coding and a video encoding apparatus and a video signal processing system using the rate control method.

DISCUSSION OF THE RELATED ART

Video compression technologies enable video data to be compressed based on a predetermined network bandwidth as available in a limited hardware operating environment.

As network environments have diversified, there are network environments where the bandwidth may vary.

SUMMARY

The inventive concept is directed towards a milti-layered video codec compression technology capable of compressing video data for variable bandwidth networks. An aspect of the inventive concept provides a technology of controlling bit rates that prevents degradation in image quality during multi-layered video encoding. An aspect of the inventive concept provides a rate control method for multi-layered video coding, performed to control bit rates at an upper layer by using encoding statistical information and/or region-of-interest (ROI) information generated based on the result of performing encoding on a lower layer. A second rate controller generates a plurality of second quantization parameters based on the encoding statistical information, to be used when encoding is performed on a plurality of regions at the second (upper) layer.

The inventive concept also provides a video encoder for controlling bit rates at an upper layer by using encoding statistical information and/or ROI information generated based on the result of performing encoding on a lower layer. Encoding statistical information generated at the base layer may include a SAD value calculated in units of macroblocks and a SAD value calculated in units of pictures.

The inventive concept also provides a video signal processing system for performing encoding on an upper layer by using encoding statistical information and/or ROI information generated based on the result of performing encoding on a lower layer.

The inventive concept also provides a computer readable recording medium having recorded thereon a computer program for performing a rate control method for multi-layered video coding.

According to an aspect of the inventive concept, there is provided a rate control method for multi-layered video coding, the method including generating encoding statistical information based on a result of encoding input video data on a first layer; determining target numbers of bits to be respectively assigned to regions of a second layer, based on the encoding statistical information; and encoding the input video data at the second layer, based on the target numbers of bits.

The regions of the second layer may include at least one from among a group of pictures (GOP), frames, and macroblocks.

The encoding statistical information may include information about numbers of bits generated when encoding is performed in units of regions of the first layer.

The encoding statistical information may include information about the sum of absolute differences (SAD) between pixel values of a current frame and a predicted frame that are calculated in units of the first layer during the encoding of the first layer.

The encoding statistical information may include information about complexities calculated in units of the regions of the first layer.

The encoding statistical information may include at least two from among information about numbers of bits generated in units of the first layer during the encoding of the first layer, information about the sum of absolute differences (SAD) between pixel values of a current frame and a predicted frame calculated in units of the regions of the first layer, and information about complexities calculated in units of the regions of the first layer.

If a spatial resolution of the video data encoded at the first layer is different from a spatial resolution of the video data at the second layer, then the target numbers of bits that are to be assigned to the regions of the second layer may be determined based on a result of up scaling or down scaling the encoding statistical information so as to control the different spatial resolutions to be the same.

Target numbers of bits that are to be respectively assigned to macroblocks of the second layer may be determined based on numbers of bits generated when macroblocks of the first layer corresponding to locations of the macroblocks of the second layer are encoded.

Target numbers of bits that are to be respectively assigned to macroblocks of the second layer may be determined based on the sum of absolute differences (SAD) between pixel values of a current frame and a predicted frame that are calculated in macroblocks of the first layer that match the macroblocks of the second layer.

Target numbers of bits that are to be assigned to macroblocks of the second layer may be determined, based on numbers of bits generated when macroblocks of the first layer that match the macroblocks of the second layer are encoded and the sum of absolute differences (SAD) between pixel values calculated in the macroblocks of the first layer that match the macroblocks of the second layer.

Target numbers of bits that are to be respectively assigned to frames of the second layer may be determined, based on at least one from among information about complexities calculated in units of the regions of the first layer and frame bit occupancy information of a group of pictures (GOP) of the first layer.

The encoding of the input video data at the second layer may include determining quantization parameters based on the target numbers of bits, and performs quantization by using the quantization parameters during the encoding of the input video data at the second layer.

The quantization parameters may be determined by adjusting parameters assigned to the regions of the second layer, according to the differences between the target numbers of bits assigned to the regions of the second layer and numbers of bits generated during the encoding of the second layer.

The rate control method may further include generating region-of-interest (ROI) information about the input video data; and determining the quantization parameters assigned related to the input video data in units of the regions of the second layer, based on the ROI information.

According to another aspect of the inventive concept, there is provided a rate control method for multi-layered video coding, the method including generating region-of-interest (ROI) information about input video data; and determining quantization parameters to be assigned to regions of an enhancement layer, based on the ROI information, determining quantization parameters that are different in a region of interest compared to in a region of non-interest, based on the ROI information.

The ROI information may be calculated using at least one from among a distribution of generated bits, image complexity, and a distribution of pixels.

According to another aspect of the inventive concept, there is provided a video encoding apparatus including a first encoding processor for generating encoding statistical information, based on a result of encoding input video data at a first layer; a rate controller for generating a quantization parameter to be used when encoding is performed on a second layer, based on the encoding statistical information; and a second encoding processor for encoding the input video data at the second layer by using the quantization parameters The encoding statistical information may include at least one from among information about numbers of bits generated when encoding is performed in units of regions of the first layer, information about the sum of absolute differences (SAD) between pixel values of a current frame and a predicted frame calculated in units of the regions of the first layer, and information about complexities of the regions of the first layer.

The rate controller may include a number-of-bits determination unit for determining target numbers of bits to be respectively assigned to regions of the second layer, based on the encoding statistical information; and a quantization parameter generation unit for generating the quantization parameters, based on the differences between the target numbers of bits and numbers of bits generated by the second encoding processor.

The number-of-bits determination unit may determine target numbers of bits to be respectively assigned to macroblocks of the second layer, based on numbers of bits generated when macroblocks of the first layer that match the macroblocks of the second layer are encoded.

The number-of-bits determination unit may determine target numbers of bits to be respectively assigned to macroblocks of the second layer, based on an SAD between pixel values of a current frame and a predicted frame calculated in macroblocks of the first layer that match the macroblocks of the second layer.

The number-of-bits determination unit may determine target numbers of bits to be respectively assigned to macroblocks of the second layer, based on at least one from among information about complexities of regions of the first layer calculated at the first layer and frame bit occupancy information of a group of pictures (GOP) of the first layer.

The video encoding apparatus may further include a region-of-interest (ROI) detection unit for detecting a region of interest of the input video data, and generating ROI information indicating the detected region of interest, and the rate controller may determine the quantization parameters to be assigned to regions of the second layer, based on the ROI information.

According to another aspect of the inventive concept, there is provided a video signal processing system including a multi-layered encoder for encoding source video data on a base layer and at least one enhancement layer, respectively; and a transmitter for the source video data encoded by the multi-layered encoder to a target device via a wired or wireless network, wherein the multi-layered encoder determines target numbers of bits to be assigned to regions of the at least one enhancement layer, based on encoding statistical information generated according to a result of encoding the source video data encoded at the base layer.

The multi-layered encoder may determine quantization parameters to be assigned to the regions of the at least one enhancement layer, based on region-of-interest (ROI) information about the source video data.

Hereinafter, the inventive concept will be described more fully with reference to the accompanying drawings, in which exemplary embodiments of the invention are shown. These embodiments are provided so that this disclosure will be thorough and complete, and will fully convey the scope of the inventive concept to those of ordinary skill in the art. The inventive concept may, however, be embodied in many different forms and should not be construed as limited to the exemplary embodiments set forth herein. It would be obvious to those of ordinary skill in the art that the above exemplary embodiments are to cover all modifications, equivalents, and alternatives falling within the scope of the inventive concept. Like reference numerals denote like elements throughout the drawings. In the drawings, the lengths and sizes of layers and regions may be exaggerated for clarity.

The terminology used herein is for the purpose of describing particular embodiments only and is not intended to be limiting of the invention. As used herein, the singular forms 'a', "an", and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

BRIEF DESCRIPTION OF THE DRAWINGS

Exemplary embodiments of the inventive concept will be more clearly understood from the following detailed description taken in conjunction with the accompanying drawings in which:

FIGS. 17A to 17C are conceptual diagrams illustrating processes of determining a target number of bits for a macroblock of an enhancement layer by using encoding statistical information of a base layer, performed by a multi-layered encoder that supports spatial scalability, according to embodiments of the inventive concept;

FIGS. 19A and 19B are conceptual diagrams illustrating processes of determining a target number of bits for a frame of an enhancement layer by using encoding statistical information of a base layer, performed by a multi-layered encoder, according to embodiments of the inventive concept;

FIG. 25 is a flowchart illustrating an operation of determining a quantization parameter of a second layer, which is included in a rate control method for multi-layered video coding, according to an exemplary embodiment of the inventive concept;

FIG. 26 is a flowchart illustrating a rate control method for multi-layered video coding, performed by a video encoding apparatus according to an exemplary embodiment of the inventive concept;

DETAILED DESCRIPTION OF THE EXEMPLARY EMBODIMENTS

Figure 1:
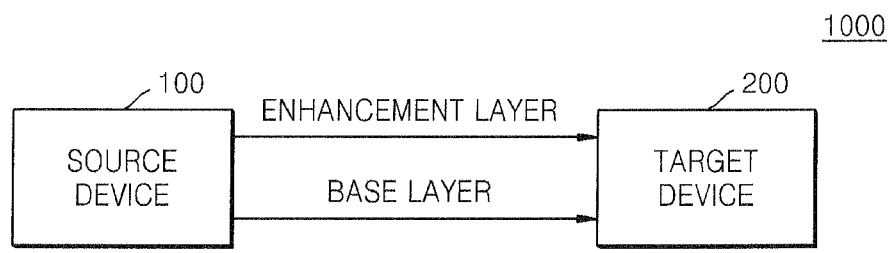
FIG. 1 is a block diagram of a video signal processing system according to an exemplary embodiment of the inventive concept.

FIG. 1 is a block diagram of a video signal processing system 1000 according to an exemplary embodiment of the inventive concept. Referring to FIG. 1, the video signal processing system 1000 includes a source device 100 and a target device 200.

Although for convenience of explanation, FIG. 1 illustrates that the target device 200 is illustrated as a single target device, it may be a plurality of target devices.

The source device 100 obtains digital video content from at least one video source and encodes the digital video content to transmit the digital video content to the target device 200. For example, the digital video content may be captured in real time or may be pre-recorded.

The source device 100 may include a transmitter that performs frequency modulation, filtering, and amplification to transmit digital encoded video data via a communication channel by using at least one antenna, or may be coupled to such a transmitter.

For scalability, the source device 100 may support multi-layered encoding. Multi-layered encoding may include, for example, scalable encoding.

Scalability means the ability of a system, network, or process to restore various video sequences having different resolutions, frame rates, and image qualities from a stream obtained by compressing a video sequence. Thus, scalability means coding a piece of video data into several bit streams and transmitting the bit streams according to channel characteristics. For example, if a piece of video data is coded into three bit streams, then only a first bitstream having the lowest quality level is transmitted while channel characteristics are poor, the first bitstream and a second bitstream having a quality level better than that of the first bitstream are transmitted when the channel characteristics improve, and all the first and second bit streams and a third bitstream having the highest quality level are transmitted when the channel characteristics improve further.

The source device 100 supporting multi-layered coding may encode a base layer that include a video having a low resolution or a small size and may further encode an enhancement layer having a screen having a higher resolution or a larger size than those of the base layer, respectively. The base layer is a bitstream encoded to be independently decoded (i.e., can be decoded without any other layer being available), but the enhancement layer is a bitstream used to improve the bitstream included in the base layer. For example, data encoded at the enhancement layer may be a result of finely encoding the difference between values of source data and data encoded at the base layer.

The source device 100 may support spatial scalability for adjusting the resolution of video, quality scalability for adjusting the quality of video, and temporal scalability for adjusting the frame rate of video. Video data may be coded according to multi-layered coding that uses various combinations of spatial scalability, quality scalability, and temporal scalability.

As described above, the source device 100 can encode source video data into a base layer and at least one enhancement layer so as to support multi-layered coding. The source device 100 modifies the source video data according to pre-established standards for the base layer and the at least one enhancement layer, and supplies the result of the modifying to the base layer and to the at least one enhancement layer. Video data having a base quality level is encoded at the base layer, and video data having a higher quality level (higher than that of the base layer) is encoded at the at least one enhancement layer.

For example, the source device 100 may encode source video data on a base layer according to ITU-T H.264/MPEG-4 Part 10 AVC standards-based scalable video coding (SVC), and may encode the source video data at the at least one enhancement layer as described below.

Technologies suggested in the inventive concept may be applied to perform video scalability expansion for devices subject to the H.264 standards. The technologies suggested in the inventive concept may also be applied with the H.264 standards, together with other video coding standards developed by an organization or defined by a standardization organization, and/or various video compression standards defined according to various video coding standards, e.g., MPEG-1, MPEG-2, ITU-T H.263 standards, Society of Motion Picture and Television Engineers (SMPTE), and High-Efficiency Video Coding (HEVC), and other standards.

The target device 200 can support receiving encoded video data via a wired or wireless network. The target device 200 may be any of various devices capable of receiving and decoding digital video data, e.g., a wireless communication device, a mobile phone, a wireless phone, a wireless broadcasting system, a personal digital assistant (PDA), a notebook computer, a desktop computer, a digital camera, a digital recording device, a video game device, and a digital television (TV).

The target device 200 can operate according to one of the various video compression standards described above, corresponding to video compression standards employed in the source device 100.

The source device 100 and the target device 200 can be implemented as wireless or wired communication devices. Also, the source device 100 and the target device 200 can be embodied as integrated circuit (IC) devices, e.g., an IC chip or a chipset. Examples of wired/wireless communication devices include a digital media player, a PDA, a mobile phone, a digital TV, and other types of devices capable of supporting a digital video application.

Figure 2:
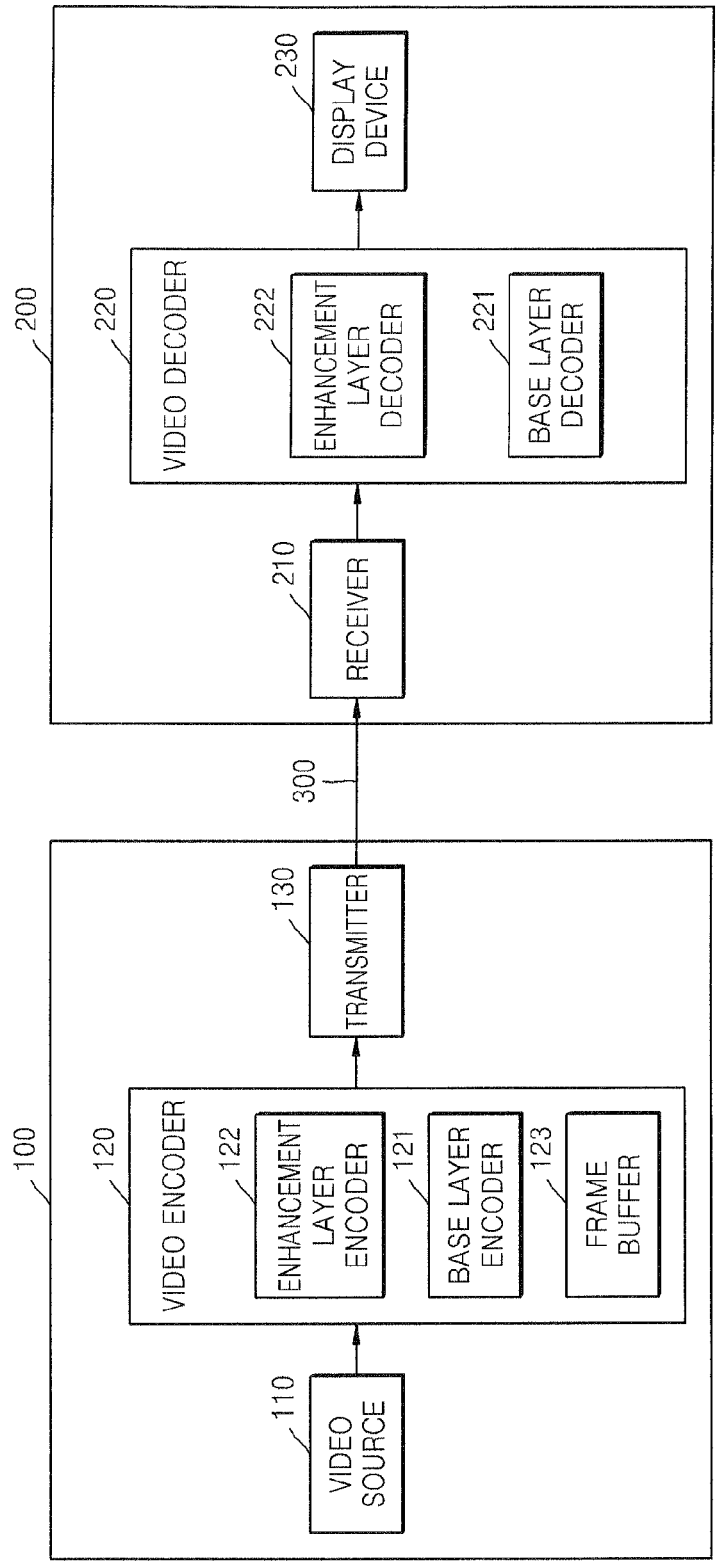
FIG. 2 is a block diagram of a source device and a target device illustrated in FIG. 1.

FIG. 2 is a block diagram of the source device 100 and the target device 200 illustrated in the video signal processing system of FIG. 1. Referring to FIG. 2, the source device 100 includes a video source 110, a video encoder 120, and a transmitter 130. The target device 200 includes a receiver 210, a video decoder 220, and a display device 230.

The video source 110 may be a video capture device, e.g., a video camera, a video content supply device, a camera phone, a video phone, a mobile phone with a built-in camera, or the like.

The video encoder 120 receives video data from the video source 110, and encodes the received video data into a base layer bitstream and at least one enhancement layer bitstream. The video encoder 120 supports multi-layered encoding.

Referring to FIG. 2, the video encoder 120 includes a base layer encoder 121, at least one enhancement layer encoder 122, and a frame buffer 123.

The base layer encoder 121 and the enhancement layer encoder 122 receive video data from the video source 110.

The base layer encoder 121 generates a base layer bitstream of video having a first quality level by encoding the video data at a first bit rate. Then, the base layer encoder 121 generates encoding statistical information based on the result of performing encoding on a base layer. For example, the encoding statistical information may include at least one from among: information about the number of bits generated to perform encoding at the base layer in units of reference sizes, information about the sum of absolute differences (SAD) between pixel values of a current frame and a predicted frame calculated in units of the reference sizes during the encoding of the base layer, and information about complexities of the reference sizes calculated at the base layer. Here, the 'reference sizes' may be selected from among groups of pictures (GOPs), frames, or macroblocks.

The base layer encoder 121 generates region-of-interest (ROI) information by analyzing received video data. The ROI information may be generated by a ROI detection unit disposed outside the base layer encoder 121.

The frame buffer 123 stores encoding statistical information generated based on the result of performing encoding by the base layer encoder 121. The frame buffer 123 may further store the ROI information generated by the base layer encoder 121. The frame buffer 123 may further store information generated by the base layer encoder 121 according to the H.264 standards and which is used by the enhancement layer encoder 122 to perform encoding. For example, the frame buffer 123 may store inter-frame/intra-frame prediction information, motion information, and residual information that are generated during an encoding process of the base layer encoder 121.

The enhancement layer encoder 122 can increase compression efficiency by performing encoding by using the inter-frame/intra-frame prediction information, the motion information, and the residual information. Also, the enhancement layer encoder 122 performs rate control by using the encoding statistical information generated by the base layer encoder 121. The operation of performing rate control in an enhancement layer by using the encoding statistical information generated at a base layer is described in detail below.

Spatial scalability may be realized by up-sampling or down-sampling input frame data.

Each of the base layer encoder 121 and the enhancement layer encoder 122 performs intra coding or inter coding on video blocks of each frame.

Intra coding is performed to reduce or remove spatial redundancies in video data in a frame or a macroblock through spatial prediction. In intra coding, a spatially predicted macroblock is formed based on at least one encoded macroblock included in the same frame as the current macroblock that is to be coded.

The base layer encoder 121 generates a predicted block based on at least one encoded macroblock included in the current frame by performing interpolation, which is an example of intra coding, by using pixel values of at least one encoded macroblock included in a base layer of the current frame.

The enhancement layer encoder 122 generate a predicted block by performing intra coding based on at least one encoded macroblock included in the current frame. For example, the enhancement layer encoder 122 can generate a predicted macroblock based on at least one encoded macroblock from a base layer and an enhancement layer in the current frame. For example, the enhancement layer encoder 122 can generate a predicted macroblock by using a weighted sum of pixel values of at least one encoded macroblock from the base layer and at least one encoded macroblock from the enhancement layer.

Inter coding is performed to reduce or remove temporal redundancies in adjacent frames of a video sequence through temporal prediction. In inter coding, the base layer encoder 121 and the enhancement layer encoder 122 perform motion estimation by matching macroblocks between two or more adjacent frames as being similar macroblocks. In inter prediction, the base layer encoder 121 and the enhancement layer encoder 122 generate temporally predicted macroblocks based on at least one encoded macroblock in different frames in a coded unit.

For example, the base layer encoder 121 compares the current macroblock with macroblocks of at least one adjacent video frame, and detects the macroblock that matches most closely the current macroblock. For example, a macroblock having the smallest SAD may be determined as the temporally predicted macroblock from among the macroblocks of the at least one adjacent video frame.

For example, the enhancement layer encoder 122 compares the current macroblock with macroblocks included in at least one adjacent frame included in a base layer and/or an enhancement layer.

Each of the base layer encoder 121 and the enhancement layer encoder 122 generates a residual macroblock by performing intra-based prediction or inter-based prediction on macroblocks to obtain a predicted block and subtracting the predicted block from the original macroblock. The 'residual macroblock' represents the difference between the current macroblock to be coded and a predicted macroblock.

Each of the base layer encoder 121 and the enhancement layer encoder 122 reduces the bit rate of a residual macroblock by performing transformation, quantization, and entropy coding. Examples of transformation include discrete cosine transformation (DCT), integral transformation, wavelet transformation, directional transformation, and other types of transformations. Transformation is performed to transform a set of pixel difference values into residual transformation coefficients representing the energies of the pixel difference values in a frequency domain.

Each of the base layer encoder 121 and the enhancement layer encoder 122 quantize residual transformation coefficients by using a quantization parameter QP. The number of bits generated to encode video data varies according to the quantization parameter QP. For example, according to the ITU-T H.264 standards, the higher the quantization parameter QP, the lower the quality of video data since the video data is encoded with a lower number of bits, and the lower the quantization parameter QP, the higher the quality of video data since the video data is encoded with a higher number of bits.

The base layer encoder 121 determines the quantization parameter QP, based on target numbers of bits that are initially set in units of frames or macroblocks and the number of bits generated when entropy coding is performed at the base layer.

Also, the enhancement layer encoder 122 determines the target number of bits in units of frames or macroblocks, based on the encoding statistical information generated by the base layer encoder 121, and then determines the quantization parameter QP based on the target number of bits and based on the number of bits generated when entropy coding is performed on an enhancement layer.

Quality scalability may be realized through residual quantization. For example, the base layer encoder 121 that encodes video data to have a lowest quality level quantizes coefficients of a base layer by using a quantization parameter QP (e.g., QP-B) that is greater than a quantization parameter QP (e.g., QP-E) used by the enhancement layer encoder 122 so as to quantize coefficients of an enhancement layer.

Also, the enhancement layer encoder 122 determines the quantization parameter QP (QP-E), based on ROI information regarding video data generated by or outside the base layer encoder 121. For example, a quantization parameter QP (QP-E) in a region of interest may be determined to be less than that in a region of non-interest.

Each of the base layer encoder 121 and the enhancement layer encoder 122 generates one-dimensional (1D) coefficient vectors by scanning a two-dimensional (2D) residual macroblock, and greatly compresses residual coefficients by entropy coding the 1D coefficient vectors. Examples of entropy coding include variable-length coding (VLC), arithmetic coding, fixed-length coding, context-adaptive VLC (CAVLC), context-adaptive binary arithmetic coding (CABAC).

Each of the base layer encoder 121 and the enhancement layer encoder 122 can encode coefficient vectors by using a single-pass encoding process or a multi-pass encoding process.

For example, the base layer encoder 121 can individually encode non-zero coefficients in single-pass encoding, starting from a first coefficient vector.

The base layer encoder 121 can select a VLC table so as to individually encode run-lengths. The base layer encoder 121 can select the VLC table so as to encode a current run value, based on the sum of symbols of runs and the sum of runs that have been coded. For example, if a coefficient vector is equal to the sum of eight runs and if a run encoded before the last non-zero coefficient is '6', then all other runs should be '0', '1', or '2'. Since an available run length becomes shorter as each of additional runs is encoded, the base layer encoder 121 can select efficient VLC tables to reduce a number of bits to be used to represent runs.

The enhancement layer encoder 122 encodes quantized residual transformation coefficients of an enhancement layer. The enhancement layer encoder 122 generates quantized residual coefficients that are different from the residual coefficients of a base layer. The quantized residual coefficients of the enhancement layer are quantized using a quantization parameter QP (QP-E) that is different from a quantization parameter QP (QP-B) of the base layer and may thus be different from the residual coefficients of the base layer.

The enhancement layer encoder 122 can control the rate by assigning a target number of bits in units of reference sizes by using encoding statistical information based on the result of performing encoding on a base layer. Thus, at least one from among quantized residual coefficients of coefficient vectors may be discarded during encoding of the enhancement layer.

The enhancement layer encoder 122 can individually encode non-zero coefficients by using single-pass encoding, starting from a first coefficient vector.

The source device 100 transmits video data, which is encoded by the video encoder 120 as described above, to the target device 200 via the transmitter 130.

The target device 200 includes the receiver 210, the video decoder 220, and the display device 230.

The receiver 210 receives an encoded video stream from the source device 100 via a channel 300. As described above, the encoded video bitstream includes a base layer bitstream and at least one enhancement layer bitstream. The channel 300 may be a wired or wireless communication channel.

The video decoder 220 obtains video data by performing decoding on a base layer and at least one enhancement layer. The video decoder 220 includes a base layer decoder 221 and an enhancement layer decoder 222. The base layer decoder 221 generates video data having a first quality level by decoding a base layer bitstream received via the channel 300. The enhancement layer decoder 222 generates video data having a second (higher) quality level by decoding at least one enhancement layer bitstream.

The number of enhancement layers that the target device 200 may receive may vary according to a channel state.

The base layer decoder 221 obtains symbols representing vectors of quantized residual coefficients of a base layer by decoding a video bitstream encoded at the base layer.

The enhancement layer decoder 222 obtains symbols representing vectors of quantized residual coefficients of an enhancement layer by decoding a video stream encoded at the enhancement layer.

The base layer decoder 221 and the enhancement layer decoder 222 generate restored base layer video data and restored enhancement layer video data by using decoded quantized residual coefficients, respectively. Thus, the quantized residual coefficients are inversely quantized, inversely quantized residual coefficients are inversely transformed, and a residual macroblock of pixel values are generated. Then, video data may be restored by combining the residual macroblock of pixel values with a predicted macroblock.

The restored video data is displayed on the display device 230. The display device 230 may be a liquid crystal display (LCD), a cathode ray tube (CRT), a plasma display, a light-emitting diode (LED) display, an organic LED display, or the like.

FIGS. 3 to 8 are block diagrams illustrating structures of multi-layered encoders according to various exemplary embodiments of the inventive concept. The multi-layered encoder may be embodied, for example, as a scalable encoder.

First, a multi-layered encoder according to an exemplary embodiment of the inventive concept will be described with reference to FIG. 3.

Figure 3:
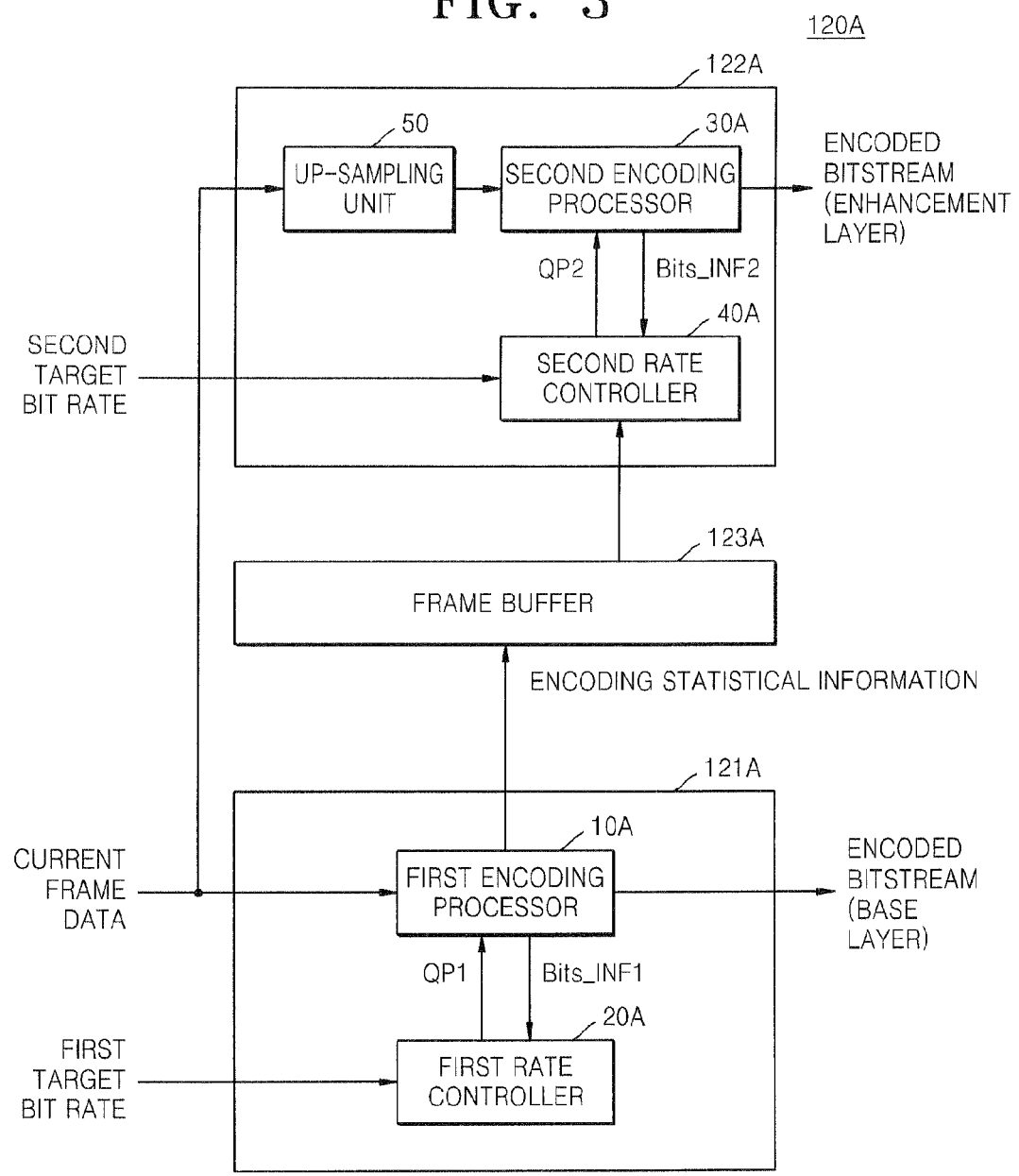
FIG. 3 is a block diagram of a multi-layered encoder according to an exemplary embodiment of the inventive concept.

FIG. 3 is a block diagram of a multi-layered encoder 120A according to an exemplary embodiment of the inventive concept. Referring to FIG. 3, the multi-layered encoder 120A includes a base layer encoder 121A, an enhancement layer encoder 122A, and a frame buffer 123A.

The base layer encoder 121A includes a first encoding processor 10A and a first rate controller 20A. The enhancement layer encoder 122A includes a second encoding processor 30A, a second rate controller 40A, and an up-sampling unit 50.

In the embodiment of FIG. 3, the up-sampling unit 50 is disposed in the enhancement layer encoder 122A. According to an alternative embodiment of the inventive concept, the up-sampling unit 50 may be disposed outside the enhancement layer encoder 122A.

When video data having the resolution of an original image is input to the multi-layered encoder 120A, the base layer encoder 121A directly encodes the original video data, and the enhancement layer encoder 122A up-samples the original video data to video data having a higher resolution by using the up-sampling unit 50 and then encodes the video data having the higher resolution.

For example, if a resolution of the original video data has a common intermediate format (CIF), the base layer encoder 121A encodes the original video data having a CIF resolution. The enhancement layer encoder 122A encodes standard definition (SD) or high definition (HD) video data, the resolution of which is increased through up-sampling. Alternatively, the enhancement layer encoder 122A may encode original video data having a high resolution and the base layer encoder 121A may encode down-scaled video data, as will be described with reference to FIG. 4 below.

The first encoding processor 10A of the base layer encoder 121A generates a base layer bitstream having a first resolution by encoding input frame data at a bit rate determined based on a first quantization parameter QP1 received from the first rate controller 20A.

The first encoding processor 10A of the base layer encoder 121A generates encoding statistical information based on the result of performing encoding. For example, the encoding statistical information may include at least one from among information about numbers of bits generated when encoding is performed in units of regions of a base layer, information about the SAD between a current frame and a predicted frame calculated in units of the regions of the base layer during the encoding of the base layer, and information about complexities of the regions of the base layer calculated at the base layer. Here, the sizes of the regions may include at least one from among sizes of GOPs, frames, and macroblocks.

The encoding statistical information generated by the first encoding processor 10A is stored in the frame buffer 123A.

The first rate controller 20A may determine target numbers of bits and quantization parameters assigned to regions of a first layer according to a first target bit rate.

The first rate controller 20A determines a first quantization parameter QP1 to be assigned to the first encoding processor 10A by adjusting quantization parameters assigned to the regions of the first layer according to the differences between target numbers of bits assigned to macroblocks according to the first target bit rate and the number of bitsBits_INF1 actually generated when the first encoding processor 10A performs entropy coding in the base layer. For example, a quantization parameter assigned to a subsequent macroblock is reduced when the target number of bits is greater than the number of bits Bits_INF1, and is increased when the target number of bits is less than the number of bits Bits_INF1. When the target number of bits is equal to the number of bits Bits_INF1, the quantization parameter assigned to the subsequent macroblock is maintained.

The up-sampling unit 50 of the enhancement layer encoder 122A up-samples input frame data to be appropriate for the resolution of an enhancement layer. The up-sampled frame data is supplied to the second encoding processor 30A.

The second encoding processor 30A of the enhancement layer encoder 122A generates an enhancement layer bitstream having a second resolution by encoding the up-sampled frame data at a bit rate determined based on a quantization parameter QP2 received from the second rate controller 40A.

The second rate controller 40A determines quantization parameters to be assigned to regions of a second layer. For example, the quantization parameters that are to be assigned to the regions of the second layer may be determined according to a second target bit rate. As another example, the quantization parameters that are to be assigned to the regions of the second layer may be determined according to ROI information.

The second rate controller 40A determines the quantization parameter QP2 to be assigned to the second encoding processor 30A by reading encoding statistical information of a base layer corresponding to the location of the current macroblock, which is to be encoded on an enhancement layer, from the frame buffer 123A, determining a target number of bits for the current macroblock and/or for the current frame, based on the read encoding statistical information of the base layer, and then adjusting quantization parameters assigned to the regions of the second layer according to the difference between the determined target number of bits and the number of bitsBits_INF2 actually generated during entropy coding of the enhancement layer. For example, a quantization parameter assigned to a subsequent macroblock is reduced when the target number of bits is greater than the number of bits Bits_INF2, and is increased when the target number of bits is less than the number of bits Bits_INF2. If the target number of bits is equal to the number of bits Bits_INF2, the quantization parameter assigned to the subsequent macroblock is maintained.

Figure 17A:
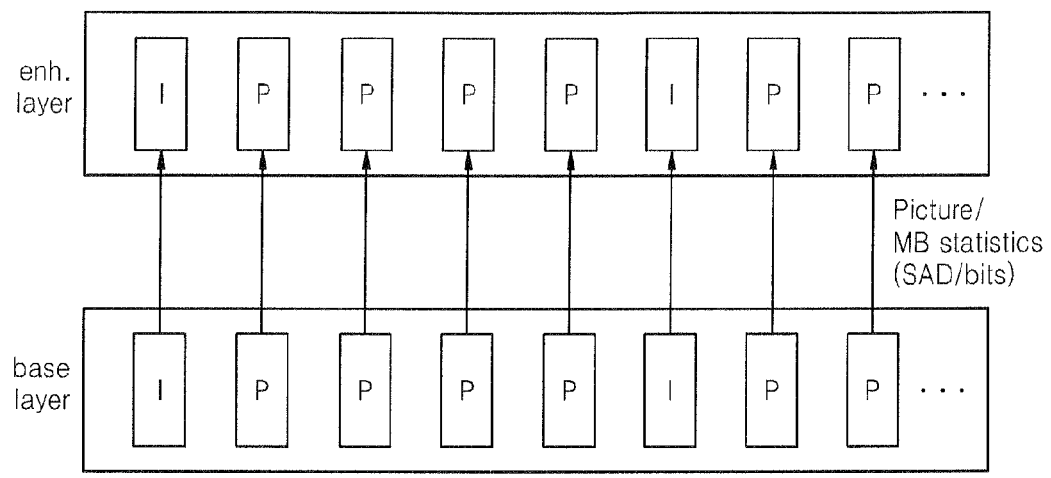
Figure 17B:
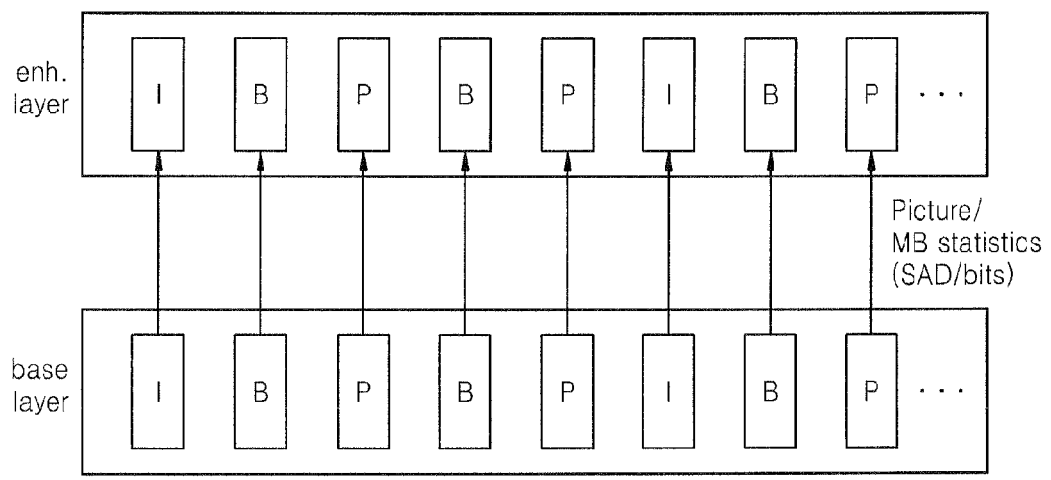

FIGS. 17A to 17C are conceptual diagrams illustrating processes of determining a target number of bits for a macroblock of an enhancement layer by using encoding statistical information of a base layer, performed by a multi-layered encoder that supports spatial scalability, according to embodiments of the inventive concept.

FIGS. 17A to 17C illustrate a case where the resolution of video data encoded at the enhancement layer is higher than that of video data encoded at the base layer.

Referring to FIGS. 17A and 17B, encoding statistical information obtained by encoding each of frames on the base layer is transmitted to the enhancement layer so that the encoding statistical information may be used to encode a frame corresponding to the enhancement layer. The encoding statistical information may be SADs calculated in units of pictures or macroblocks, or numbers of bits that are actually generated in units of pictures or macroblocks. FIG. 17A illustrates a case where encoding is performed on a GOP consisting of I pictures and P pictures. FIG. 17B illustrates a case where encoding is performed on a GOP consisting of I pictures, B pictures, and P pictures.

Referring to FIG. 17C, a target bit value MB_target_bit of a macroblock for the enhancement layer may be determined based on: a result of up-scaling an SAD value ME_MB_SAD calculated in units of macroblocks; and a SAD value ME_PIC_SAD calculated in units of pictures, which are encoding statistical information generated at the base layer. For example, a macroblock of the base layer corresponding to a location of a macroblock that is to be encoded at the enhancement layer is detected, and the target bit value MB_target bit of the macroblock for the enhancement layer may be determined using an SAD value ME_MB_SAD of the detected macroblock of the base layer.

FIG. 17C illustrates a case where a number of macroblocks included in one picture of the enhancement layer is four times the number of macroblocks included in one picture of the base layer. FIG. 17C illustrates a case where a target bit value MB_target_bit of each of four macroblocks of the enhancement layer is determined by using an SAD value ME_MB_SAD calculated in one macroblock of the base layer.

Next, a multi-layered encoder according to an exemplary embodiment of the inventive concept will now be described with reference to FIG. 4.

Figure 4:
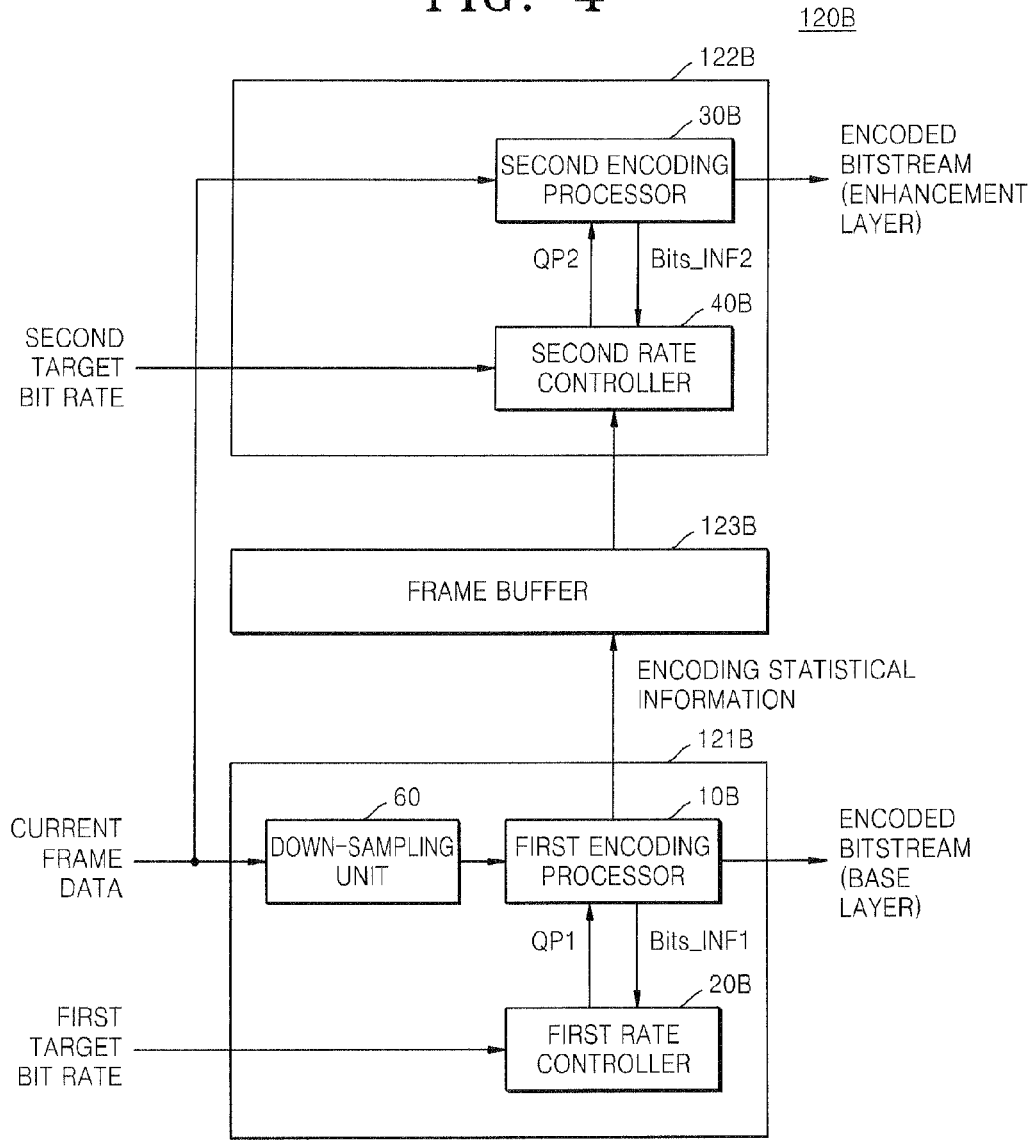
FIG. 4 is a block diagram of a multi-layered encoder according to an exemplary embodiment of the inventive concept.

FIG. 4 is a block diagram of a multi-layered encoder 120B supporting spatial scalability, according to an exemplary embodiment of the inventive concept. Referring to FIG. 4, the multi-layered encoder 120B includes a base layer encoder 121B, an enhancement layer encoder 122B, and a frame buffer 123B.

The base layer encoder 121B includes a first encoding processor 10B, a rate controller 20B, and a down-sampling unit 60. The enhancement layer encoder 122B includes a second encoding processor 30B and a second rate controller 40B.

In the exemplary embodiment of FIG. 4, the down-sampling unit 60 is disposed in the base layer encoder 121B. According to an alternative embodiment of the inventive concept, the down-sampling unit 60 may be disposed outside the base layer encoder 121B.

When video data having the resolution of an original image is input to the multi-layered encoder 120B, the enhancement layer encoder 122B directly encodes the original video data, and the base layer encoder 121B down-samples the original video data to video data having a resolution lower than that of the original image and then encodes the downsampled video data.

For example, if the original video data has an HD resolution, then the base layer encoder 121B down-samples the original video data to video data having a standard definition (SD) resolution or a CIF resolution that is lower than the HD resolution and encodes the downsampled video data, and the enhancement layer encoder 122B encodes the HD original video data.

The down-sampling unit 60 of the base layer encoder 121B down-samples input frame data to be appropriate for the resolution of the base layer. The down-sampled frame data is supplied to the first encoding processor 10B.

The first encoding processor 10B of the base layer encoder 121B generates a base layer bitstream having a first resolution by encoding the down-sampled frame data at a bit rate determined based on a first quantization parameter QP1 received from the first rate controller 20B.

The first encoding processor 10B of the base layer encoder 121B generates encoding statistical information based on the result of performing encoding. The encoding statistical information generated by the base layer encoder 121B is the same as the encoding statistical information described above with reference to FIG. 3.

The encoding statistical information generated by the base layer encoder 121B is stored in the frame buffer 123B.

The operation of the first rate controller 20B is substantially the same as that of the first rate controller 20A of FIG. 3 and thus will not be redundantly described here.

An enhancement layer bitstream having a second resolution is generated by encoding frame data input to the enhancement layer encoder 122B at a bit rate determined based on a second quantization parameter QP2 supplied by the second rate controller 40B.

The second rate controller 40B determines quantization parameters assigned to regions of the second layer. For example, the quantization parameters assigned to the regions of the second layer may be determined according to a second target bit rate. As an alternative example, the quantization parameters assigned to the regions of the second layer may be determined according to ROI information.

The second rate controller 40B determines the second quantization parameter QP2 to be assigned to the second encoding processor 30 by reading encoding statistical information of a base layer corresponding to the location of a current macroblock which is to be encoded on an enhancement layer, from the frame buffer 123B, determining a target number of bits for a macroblock and/or a frame, based on the read encoding statistical information of the base layer, and then adjusting quantization parameters assigned to the regions of the second layer according to the difference between the determined target number of bits and the number of bitsBits_INF2 actually generated during entropy coding of the enhancement layer. For example, a quantization parameter assigned to a subsequent macroblock is reduced when (e.g., only if) the target number of bits is greater than the number of bits Bits_INF2, and is increased when (e.g., only if) the target number of bits is less than the number of bits Bits_INF2. If the target number of bits is equal to the number of bits Bits_INF2, the quantization parameter assigned to the subsequent macroblock is maintained.

Figure 5:
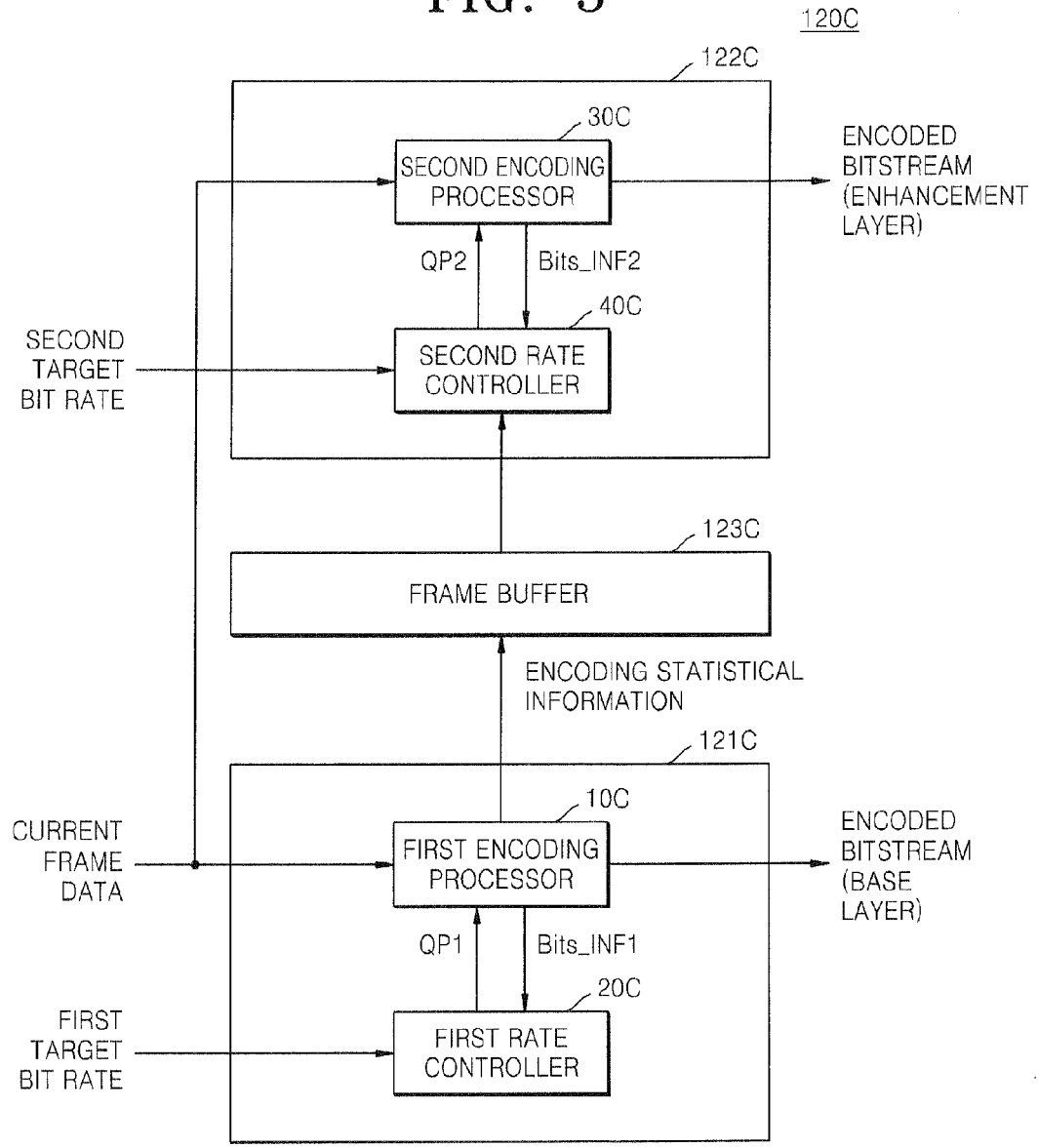
FIG. 5 is a block diagram of a multi-layered encoder according to an exemplary embodiment of the inventive concept.

FIG. 5 is a block diagram of a multi-layered encoder 120C supporting quality scalability, according to an exemplary embodiment of the inventive concept. Referring to FIG. 5, the multi-layered encoder 120C includes a base layer encoder 121C, an enhancement layer encoder 122C, and a frame buffer 123C.

Specifically, the base layer encoder 121C includes a first encoding processor 10C and a first rate controller 20C, and the enhancement layer encoder 122C includes a second encoding processor 30C and a second rate controller 40C.

In the case of a multi-layered encoder supporting quality scalability, when the resolution of video data encoded on a base layer is equal to that of video data encoded on an enhancement layer, up/down sampling does not need to be performed at the enhancement layer.

The first encoding processor 10C of the base layer encoder 121C generates a base layer bitstream having a first quality level by encoding original video data at a bit rate determined based on a first quantization parameter QP1 received from the first rate controller 20C.

The base layer encoder 121C generates encoding statistical information based on the result of performing encoding. The encoding statistical information generated by the base layer encoder 121C is the same as the encoding statistical information described above with reference to FIG. 3.

The encoding statistical information generated by the base layer encoder 121C is stored in the frame buffer 123C.

The first rate controller 20C determines the first quantization parameter QP1 to be assigned to the first encoding processor 10C by adjusting quantization parameters assigned to regions of the base layer according to the difference between a target number of bits assigned to a macroblock according to a first target bit rate and the number of bits Bits_INF1 actually generated when the first encoding processor 10A entropy codes the base layer. For example, a quantization parameter assigned to a subsequent macroblock is reduced if the target number of bits is greater than the number of bits Bits_INF1, and is increased if the target number of bits is less than the number of bits Bits_INF1. If the target number of bits is equal to the number of bits Bits_INF1, then the quantization parameter assigned to the subsequent macroblock is maintained.

The second encoding processor 30C of the enhancement layer encoder 122C generates an enhancement layer bitstream having a second quality level by encoding input frame data at a bit rate determined based on a second quantization parameter QP2 received from the second rate controller 40C.

The second rate controller 40C determines the second quantization parameter QP2 to be assigned to the second encoding processor 30C by reading encoding statistical information of a base layer corresponding to the location of a macroblock which is to be encoded on an enhancement layer, from the frame buffer 123C, determining a target number of bits for a macroblock and/or a frame, based on the read encoding statistical information of the base layer, and then adjusting quantization parameters assigned to the regions of the enhancement layer according to the difference between the determined target number of bits and the number of bits Bits_INF2 actually generated during entropy coding of the enhancement layer. For example, a quantization parameter assigned to a subsequent macroblock is reduced when the target number of bits is greater than the number of bits Bits_INF2, and is increased when the target number of bits is less than the number of bits Bits_INF2. If the target number of bits is equal to the number of bits Bits_INF2, the quantization parameter assigned to the subsequent macroblock is maintained.

FIGS. 18A to 18D are conceptual diagrams illustrating processes of determining a target number of bits for a macroblock of an enhancement layer by using encoding statistical information of a base layer, performed by a multi-layered encoder that supports quality scalability, according to embodiments of the inventive concept.

FIGS. 18A to 18D illustrate various multi-layered video coding techniques based on medium grained scalability (MGS) or coarse grained scalability (CGS).

Figure 18A:
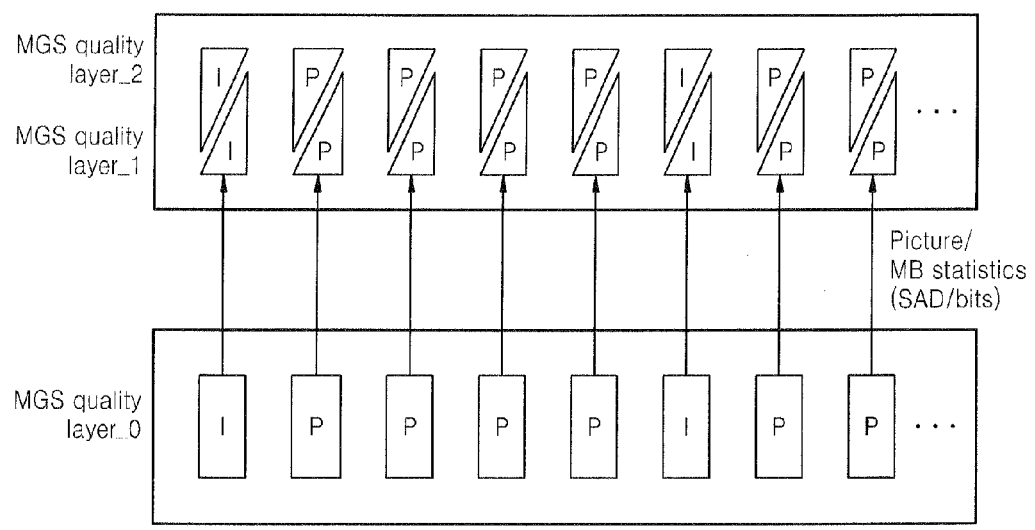
FIGS. 18A to 18D are conceptual diagrams illustrating processes of determining a target number of bits for a macroblock of an enhancement layer by using encoding statistical information of a base layer, performed by a multi-layered encoder that supports quality scalability, according to embodiments of the inventive concept.
Figure 18B:
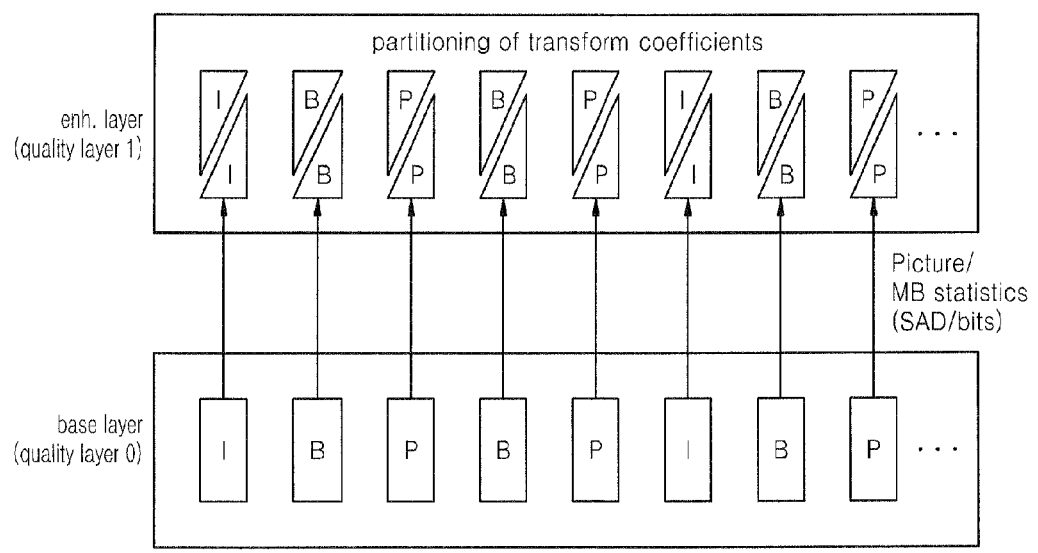
Figure 18C:
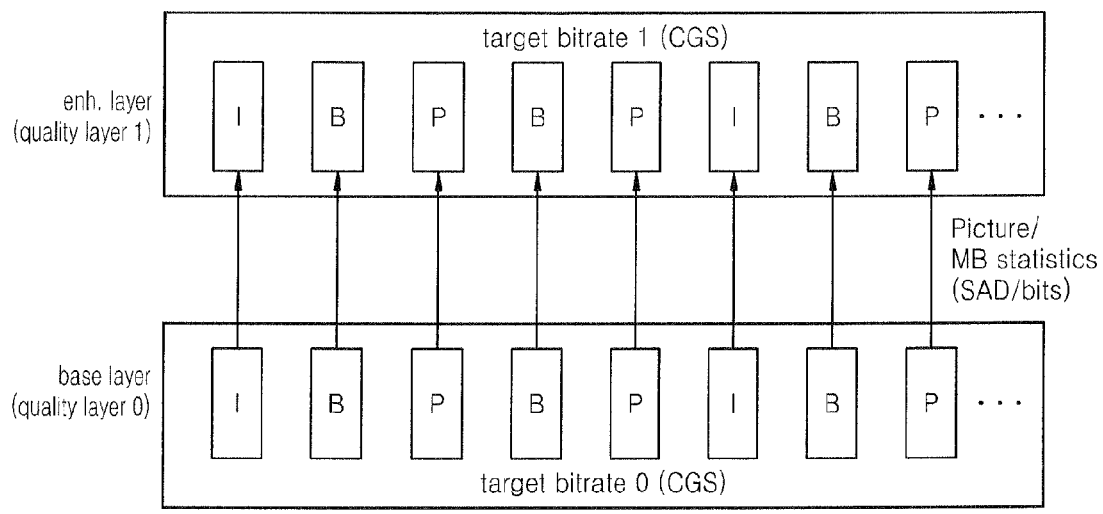

Referring to FIGS. 18A to 18C, encoding statistical information generated when encoding is performed at the base layer in units of frames is transmitted to the enhancement layer so that the encoding statistical information may be used to encode a frame corresponding to the enhancement layer. The encoding statistical information may be SADs calculated in units of pictures or in units of macroblocks and/or the number of bits that are actually generated. For example, the base layer may correspond to an MGS quality layer_0, and the enhancement layer may be a combination of MGS quality layers divided from coefficients transformed into a frequency domain.

Figure 18D:
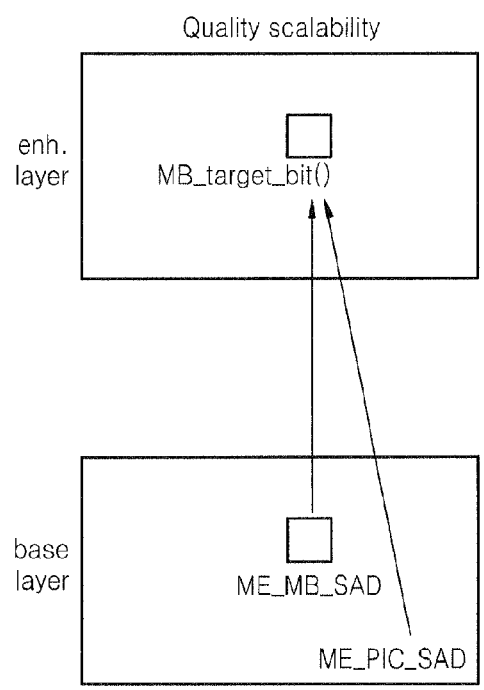

Referring to FIG. 18D, encoding statistical information generated when encoding is performed at the base layer in units of frames is transmitted to the enhancement layer so that the encoding statistical information may be used to encode a frame corresponding to the enhancement layer. The encoding statistical information may be an SAD calculated in units of pictures or in units of macroblocks and/or the number of bits that are actually generated. The base layer corresponds to a CGS quality layer 1 encoded with a layer target bit 0.

Referring to FIG. 18D, target bit values MB_target_bit of macroblocks of the enhancement layer are determined based on the encoding statistical information generated on the base layer, i.e., SADs ME_MB_SAD calculated in units of macroblocks and/or SADs ME_PIC_SAD calculated in units of pictures.

Figure 6:
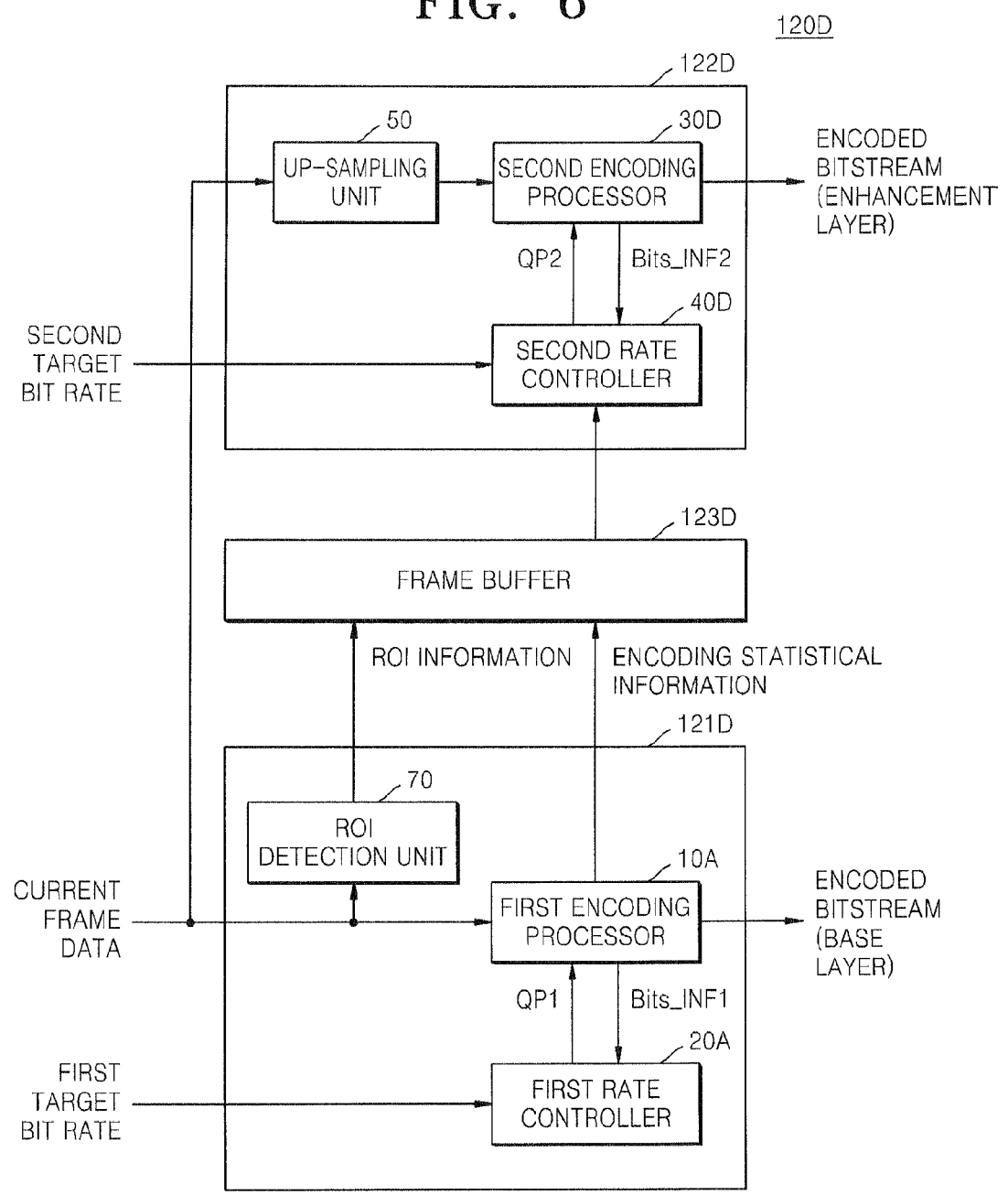
FIG. 6 is a block diagram of a multi-layered encoder according to an exemplary embodiment of the inventive concept.

FIG. 6 is a block diagram of a multi-layered encoder 120D supporting spatial scalability, according to an exemplary embodiment of the inventive concept. Referring to FIG. 6, the multi-layered encoder 120D includes a base layer encoder 121D, an enhancement layer encoder 122D, and a frame buffer 123D.

The base layer encoder 121D includes a first encoding processor 10A, a first rate controller 20A, and a region of interest (ROI) detection unit 70. The enhancement layer encoder 122D includes a second encoding processor 30D, a second rate controller 40D, and an up-sampling unit 50.

In the embodiment of FIG. 6, the up-sampling unit 50 is disposed in the enhancement layer encoder 122D. According to an alternative embodiment of the inventive concept, the up-sampling unit 50 may be disposed outside the enhancement layer encoder 122D.

The ROI detection unit 70 calculates ROI information by analyzing frame data, based on at least one from among information about the complexity of an image, information about the amount of motion of the image, and information about the distribution of pixels of the image. For example, a region of the image, the degree of change, the amount of motion, or the distribution of pixels, which is equal to or greater than a first threshold, may be determined as a region of interest (ROI), and a region of the image, the degree of change, the amount of motion, or the distribution of pixels, which is less than a second threshold, may be determined as a region of non-interest. The first threshold is set to be greater than the second threshold. A method of calculating the ROI information is described in detail with reference to FIGS. 9 to 11 below.

The first encoding processor 10A and the first rate controller 20A of the base layer encoder 121D are the same as the first encoding processor 10A and the first rate controller 20A of the base layer encoder 121A of FIG. 3, respectively.

The base layer encoder 121D generates encoding statistical information based on the result of performing encoding.

The frame buffer 123D stores the encoding statistical information and ROI information generated by the base layer encoder 121D.

The up-sampling unit 50 of the enhancement layer encoder 122D up-samples input original video data appropriate for the resolution of an enhancement layer. The up-sampled video data is supplied to the second encoding processor 30D.

The second encoding processor 30D of the enhancement layer encoder 122D generates an enhancement layer bitstream having a second resolution by encoding the up-sampled video data at a bit rate determined based on a second quantization parameter QP2 received from the second rate controller 40D.

For example, the second rate controller 40D may read encoding statistical information of a base layer corresponding to the location of a macroblock, which is to be encoded at the enhancement layer, from the frame buffer 123D, and determine a target number of bits for a macroblock and/or a frame, based on the read encoding statistical information.

As an alternative, the second rate controller 40D determines a target number of bits for a macroblock according to a second target bit rate corresponding to the resolution of the enhancement layer.

Also, the second rate controller 40D determines quantization parameters to be assigned to regions of the enhancement layer, based on the ROI information generated at the base layer by the base layer encoder 121D. For example, a quantization parameter in a region of interest may be set to be less than that in a region of non-interest.

Figure 20A:
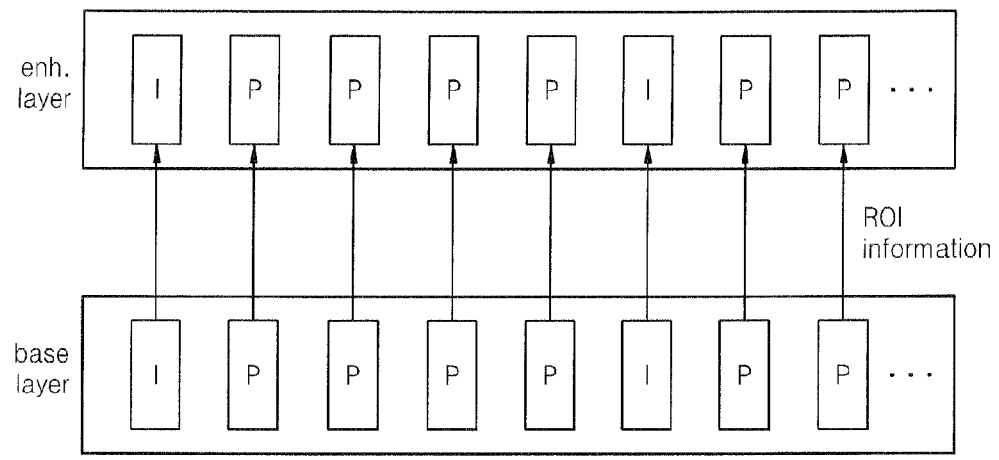
FIGS. 20A to 20C are conceptual diagrams illustrating processes of assigning quantization parameters to macroblocks of an enhancement layer by using ROI information of a base layer, performed by a multi-layered encoder that supports spatial scalability, according to embodiments of the inventive concept.
Figure 20B:
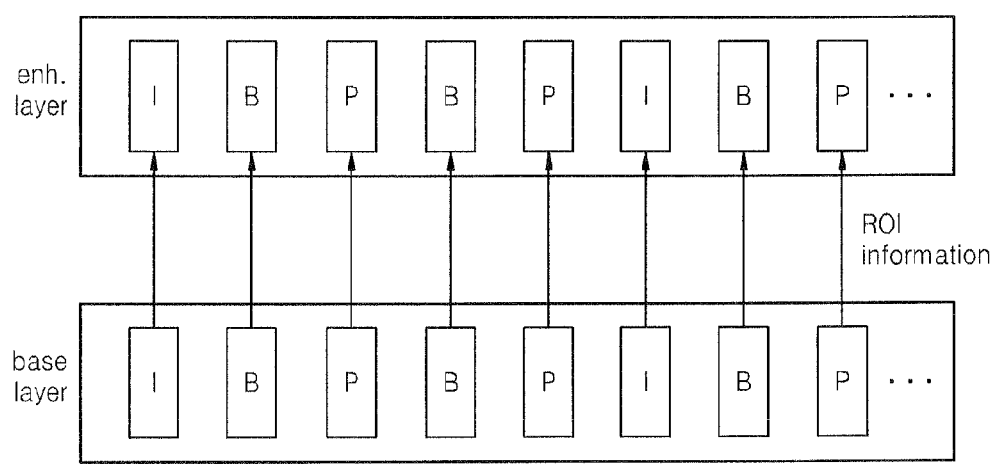
Figure 20C:
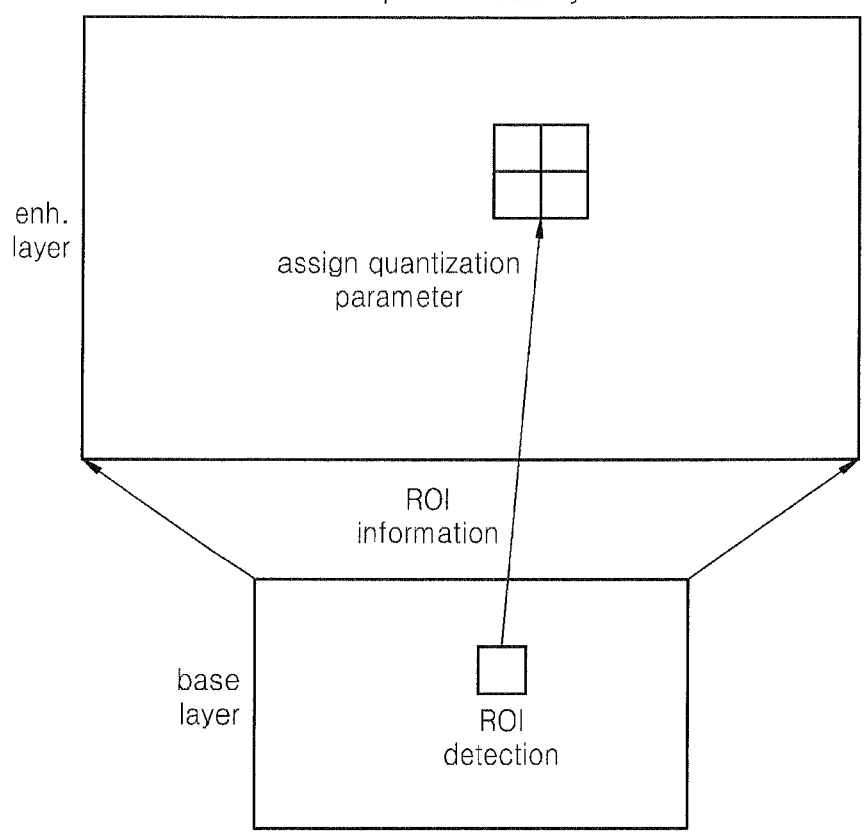

FIGS. 20A to 20C are conceptual diagrams illustrating processes of assigning a quantization parameter to a macroblock of an enhancement layer by using ROI information of a base layer, performed by a multi-layered encoder that supports spatial scalability, according to exemplary embodiments of the inventive concept.

Referring to FIGS. 20A and 20B, ROI information generated when encoding is performed at the base layer in units of frames is transmitted to the enhancement layer so that the ROI information may be used to assign a quantization parameter to a frame corresponding to the enhancement layer.

FIG. 20A illustrates a case where encoding is performed on a GOP consisting of I pictures and P pictures. FIG. 20B illustrates a case where encoding is performed on a GOP consisting of I pictures, B pictures, and P pictures.

Referring to FIG. 20C, quantization parameters may be assigned to macroblocks of the enhancement layer, based on ROI information generated at the base layer. For example, a macroblock of the base layer corresponding to the location of a macroblock that is to be encoded at the enhancement layer may be detected, and quantization parameters may be assigned to macroblocks of the enhancement layer, based on ROI information about the detected macroblock of the base layer.

For example, FIG. 20C illustrates a case where the number of macroblocks included in one picture of the enhancement layer is four times than the number of macroblocks included in one picture of the base layer. Referring to FIG. 20C, quantization parameters may be assigned to macroblocks of the enhancement layer, based on the ROI information generated in one macroblock of the base layer.

Figure 22:
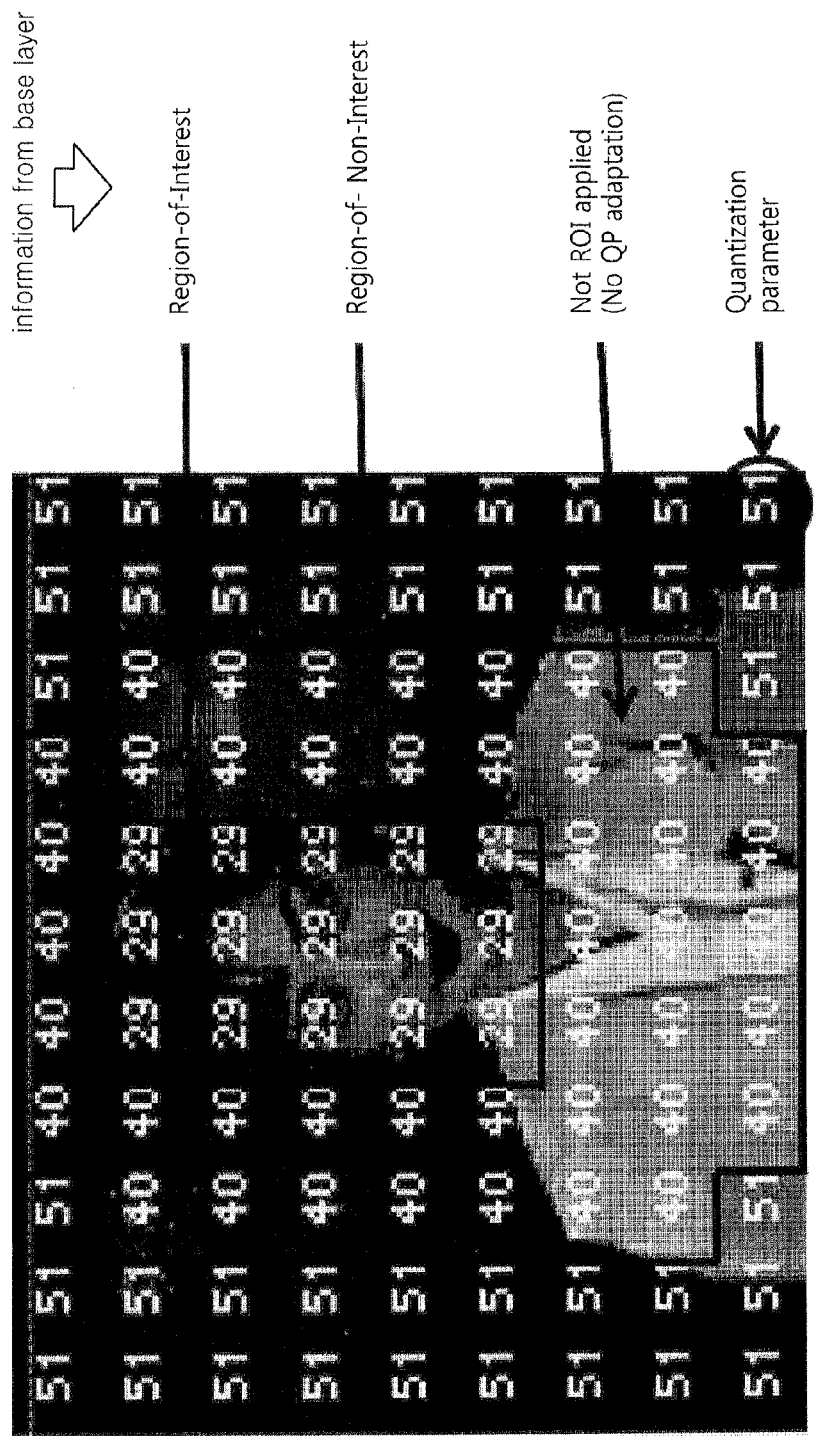
FIG. 22 illustrates quantization parameters assigned to an enhancement layer by using ROI information, according to an exemplary embodiment of the inventive concept.

FIG. 22 illustrates quantization parameters assigned to an enhancement layer by using ROI information, according to an exemplary embodiment of the inventive concept. Referring to FIG. 22, a quantization parameter '29' is assigned to a region of interest, and a quantization parameter '51' is assigned to a region of non-interest. A quantization parameter '40' is assigned to a region that is neither a region of interest nor a region of non-interest.

The second rate controller 40D of FIG. 6 determines a second quantization parameter QP2 to be assigned to the second encoding processor 30D of FIG. 6 by adjusting a quantization parameter assigned to a subsequent macroblock according to the difference between a target number of bits assigned to the current macroblock and the number of bits-Bits_INF2 that are actually generated by entropy coding the current macroblock. For example, a quantization parameter assigned to a subsequent macroblock is reduced when the target number of bits is greater than the number of bits Bits_INF2, and is increased when the target number of bits is less than the number of bits Bits_INF2. The quantization parameter assigned to the subsequent macroblock is maintained if the target number of bits is equal to the number of bits Bits_INF2. A quantization parameter assigned based on the ROI information is used when a first macroblock of each of frames is encoded.

Figure 7:
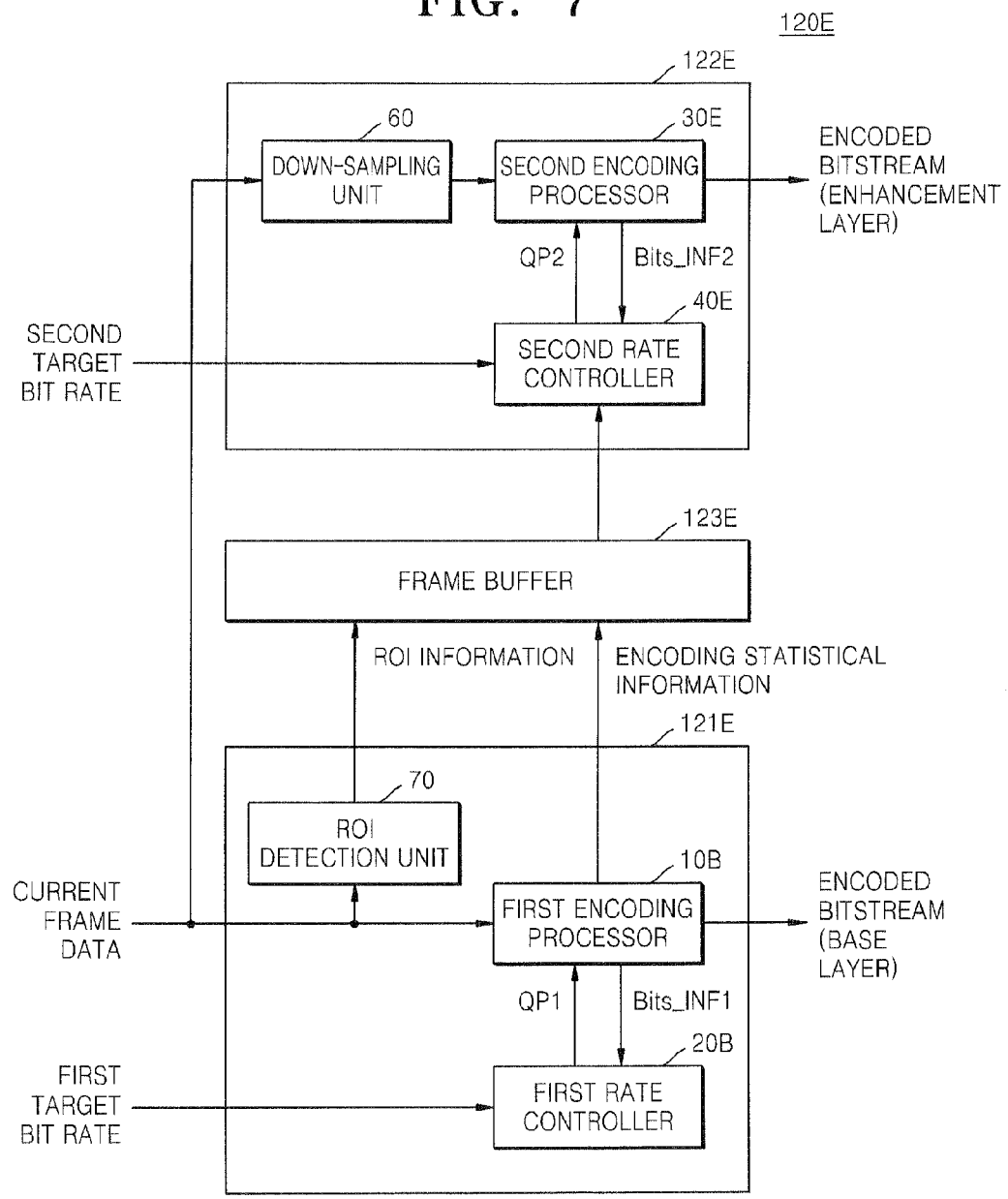
FIG. 7 is a block diagram of a multi-layered encoder according to an exemplary embodiment of the inventive concept.

FIG. 7 is a block diagram of a multi-layered encoder 120E supporting spatial scalability, according to an exemplary embodiment of the inventive concept. Referring to FIG. 7, the multi-layered encoder 120E includes a base layer encoder 121E, an enhancement layer encoder 122E, and a frame buffer 123E.

The base layer encoder 121E includes a first encoding processor 10B, a first rate controller 20B, and an ROI detection unit 70. The enhancement layer encoder 122E includes a second encoding processor 30E, a down-sampling unit 60, and a second rate controller 40E.

In the embodiment of FIG. 7, the down-sampling unit 60 is disposed in the enhancement layer encoder 122E. According to an alternative embodiment of the inventive concept, the down-sampling unit 60 may be disposed outside the enhancement layer encoder 122E.

The ROI detection unit 70 calculates ROI information by analyzing input image data as described above with reference to FIG. 6.

The down-sampling unit 60 of the enhancement layer encoder 122E down-samples input original video data to be appropriate for the resolution of a enhancement layer. The down-sampled video data is supplied to the second encoding processor 30E.

The first encoding processor 10B and the first rate controller 20B of the base layer encoder 121E are the same as the first encoding processor 10B and the first rate controller 20B of base layer encoder 121B of FIG. 4, respectively. Thus, the base layer encoder 121E can generate encoding statistical information based on the result of performing encoding at the base layer. Also, the base layer encoder 121E generates ROI information.

The frame buffer 123E stores encoding statistical information and the ROI information generated by the base layer encoder 121E.

The second encoding processor 30E of the enhancement layer encoder 122E generates an enhancement layer bitstream having a second resolution by encoding downsampled video data at a bit rate determined based on a second quantization parameter QP2 received from the second rate controller 40E.

For example, the second rate controller 40E may read encoding statistical information of the base layer corresponding to the location of a current macroblock, which is to be encoded at an enhancement layer, from the frame buffer 123E, and determine a target number of bits for the current macroblock and/or frame, based on the encoding statistical information.

As another example, the second rate controller 40E may determine a target number of bits for the current macroblock at a second target bit rate corresponding to the resolution of the enhancement layer.

The second rate controller 40E determines quantization parameters to be assigned to a region of the enhancement layer, based on the ROI information generated by the base layer encoder 121E. For example, the quantization parameter in a region of interest may be set to be less than that in a region of non-interest.

Quantization parameters may be assigned to macroblocks of the enhancement layer based on the ROI information of the base layer, as described above with reference to FIGS. 20A to 20C.

The second rate controller 40E adjusts a quantization parameter assigned to a subsequent macroblock according to the difference between a target number of bits assigned to the current macroblock and the number of bitsBits_INF2 that are actually generated by entropy coding the current macroblock. For example, the quantization parameter assigned to a subsequent macroblock is reduced when the target number of bits is greater than the number of bits Bits_INF2, and is increased when the target number of bits is less than the number of bits Bits_INF2. The quantization parameter assigned to the subsequent macroblock is maintained if the target number of bits is equal to the number of bits Bits_INF2. A quantization parameter assigned based on the ROI information is used when a first macroblock of each of frames is encoded.

Figure 8:
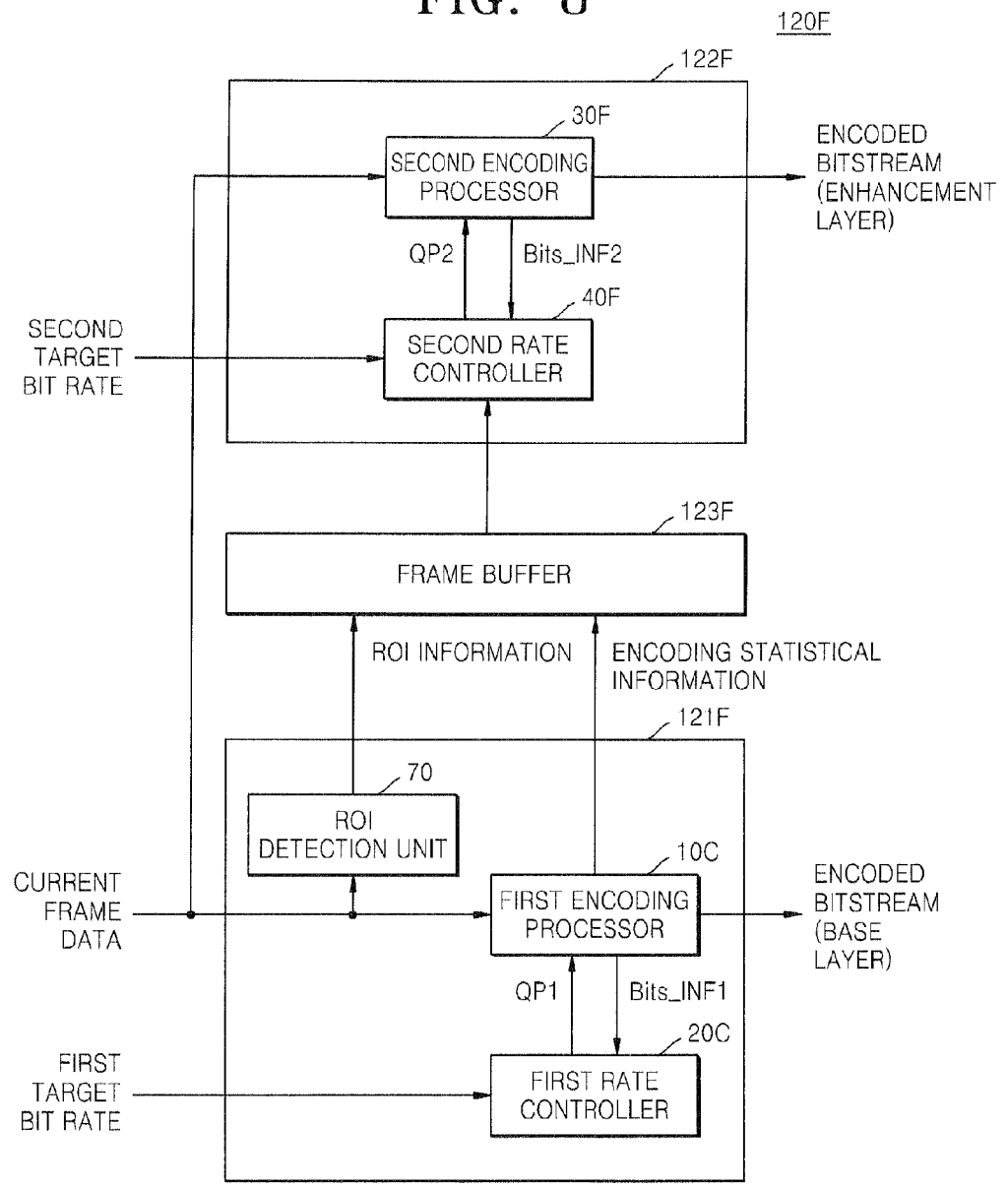
FIG. 8 is a block diagram of a multi-layered encoder according to an exemplary embodiment of the inventive concept.

FIG. 8 is a block diagram of a multi-layered encoder 120F supporting quality scalability, according to an exemplary embodiment of the inventive concept. Referring to FIG. 8, the multi-layered encoder 120F includes a base layer encoder 121F, an enhancement layer encoder 122F, and a frame buffer 123F.

The base layer encoder 121F includes a first encoding processor 10C, a first rate controller 20C, and an ROI detection unit 70. The enhancement layer encoder 122E includes a second encoding processor 30F and a second rate controller 40F.

As described above with reference to FIG. 6, the ROI detection unit 70 calculates ROI information by analyzing input image data.

The first encoding processor 10C and the first rate controller 20C of the base layer encoder 121F are the same as the first encoding processor 10C and the first rate controller 20C of the base layer encoder 121C of FIG. 5, respectively. Thus, the base layer encoder 121F may generate encoding statistical information based on the result of performing encoding at the base layer. The base layer encoder 121F may also generate ROI information.

The frame buffer 123F stores the encoding statistical information and the ROI information generated by the base layer encoder 121F.

The enhancement layer encoder 122F generates an enhancement layer bitstream having the original resolution by encoding input original frame data at a bit rate determined based on a second quantization parameter QP2 received from the second rate controller 40F.

For example, the second rate controller 40F may read encoding statistical information of the base layer corresponding to the current macroblock, which is to be encoded at the enhancement layer, from the frame buffer 123F, and determine a target number of bits for the current macroblock and/or a frame, based on the read encoding statistical information of the base layer.

As an alternative example, the second rate controller 40F may determine a target number of bits for a macroblock at a second target bit rate corresponding to the resolution of the enhancement layer.

Also, the second rate controller 40F assigns quantization parameters to the enhancement layer based on the ROI information generated by the base layer encoder 121F. For example, a quantization parameter in a region of interest may be set to be less than that in a region of non-interest.

FIGS. 21A to 21D are conceptual diagrams illustrating processes of assigning a quantization parameter to a macroblock of an enhancement layer by using ROI information of a base layer, performed by a multi-layered encoder that supports quality scalability, according to embodiments of the inventive concept.

FIGS. 21A to 21D illustrate various multi-layered video coding techniques based on MGS or CGS.

Figure 21A:
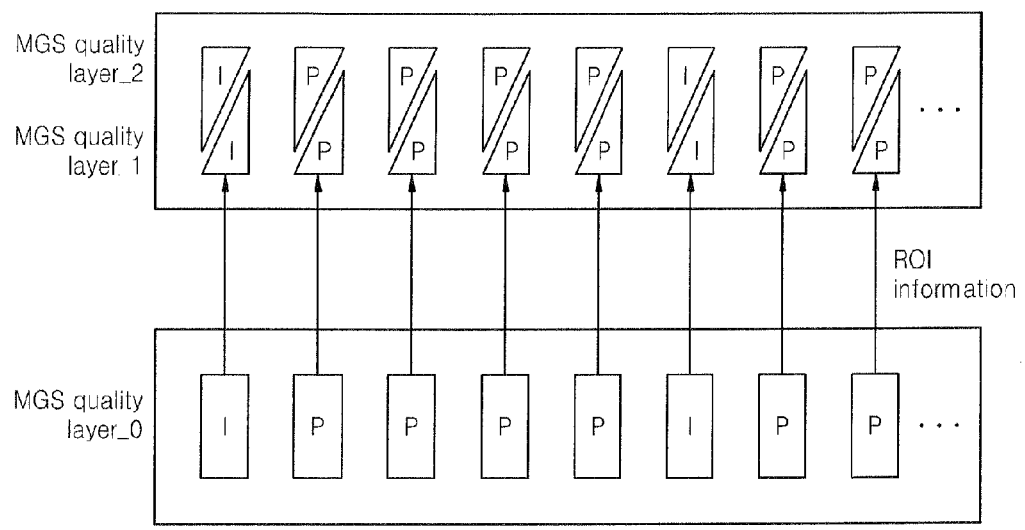
FIGS. 21A to 21D are conceptual diagrams illustrating processes of assigning quantization parameters to macroblocks of an enhancement layer by using ROI information of a base layer, performed by a multi-layered encoder that supports quality scalability, according to embodiments of the inventive concept.

Referring to FIG. 21A, ROI information generated when encoding is performed on a base layer MSG Quality layer_0 in units of frames may be transmitted to enhancement layers MSG Quality layer_1 and MSG Quality layer_2 so that the ROI information may be used to assign quantization parameters for frames corresponding to these enhancement layers.

Figure 21B:
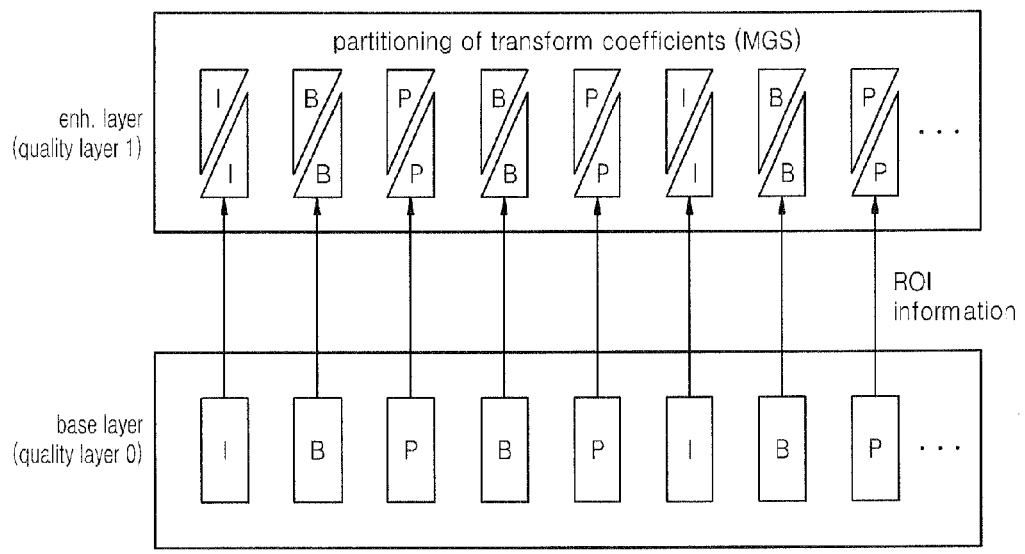
Figure 21C:
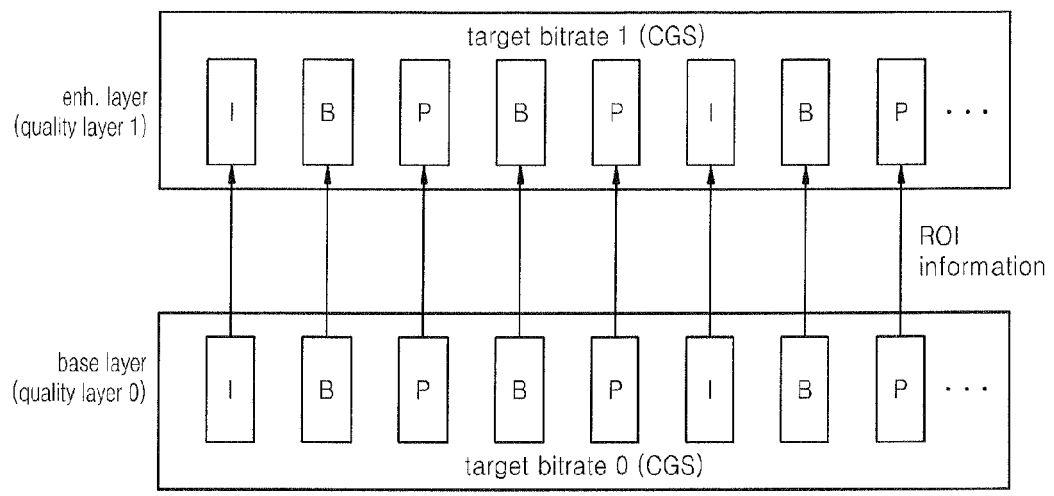

Referring to FIGS. 21B and 21C, ROI information generated when encoding is performed on a base layer MSG Quality layer_0 in units of frames may be transmitted to an enhancement layer Quality layer_1 so that the ROI information may be used to assign quantization parameters to frames corresponding to the enhancement layer Quality layer_1.

Figure 21D:
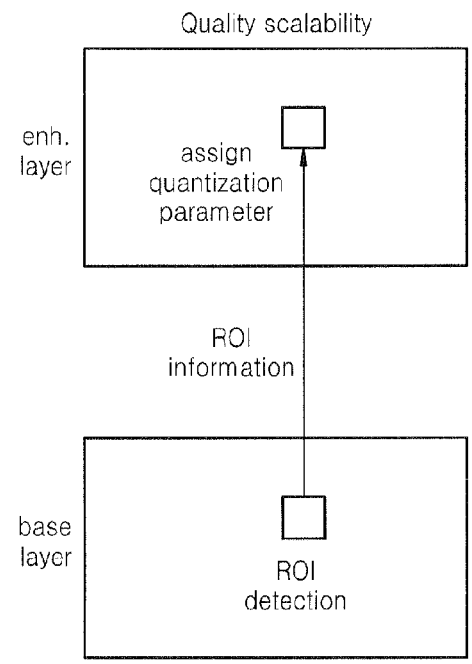

Referring to FIG. 21D, quantization parameters may be assigned to macroblocks of an enhancement layer based on ROI information generated at a base layer. The quantization parameters may be assigned to the macroblocks of the enhancement layer by detecting macroblocks of the base layer corresponding to locations of macroblocks that are to be encoded at the enhancement layer and using ROI information of the detected macroblocks of the base layer.

The second rate controller 40F of FIG. 8 determines a second quantization parameter QP2 to be assigned to the second encoding processor 30F by adjusting a quantization parameter assigned to a subsequent macroblock according to the difference between a target number of bits assigned to the current macroblock and the number of bitsBits_INF1 that are actually generated when the current macroblock is entropy coded.

For example, a quantization parameter assigned to a subsequent macroblock is reduced when the target number of bits is greater than the number of bits Bits_INF1, and is increased when the target number of bits is less than the number of bits Bits_INF1. The quantization parameter assigned to the subsequent macroblock is maintained if the target number of bits is equal to the number of bits Bits_INF1. A quantization parameter assigned based on the ROI information is used when a first macroblock of each of frames is encoded.

As illustrated in FIGS. 6 to 8, the ROI detection unit 70 may be disposed in each of the base layer encoders 121D to 121F. According to an alternative embodiment of the inventive concept, the ROI detection unit 70 may be disposed outside of each of the base layer encoders 121D to 121F.

Figure 9:
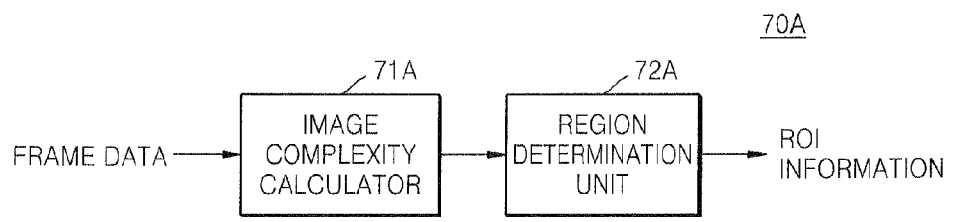
FIG. 9 is a block diagram of a region-of-interest (ROI) detection unit according to an exemplary embodiment of the inventive concept.
Figure 10:
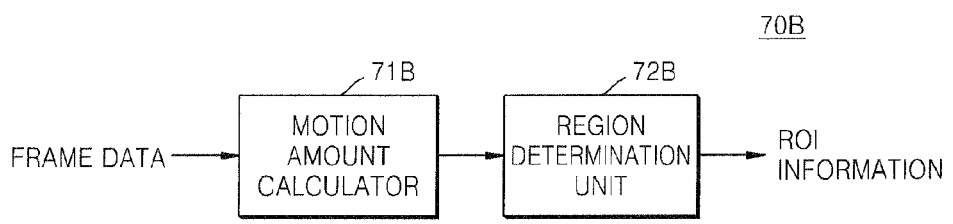
FIG. 10 is a block diagram of an ROI detection unit according to an exemplary embodiment of the inventive concept.
Figure 11:
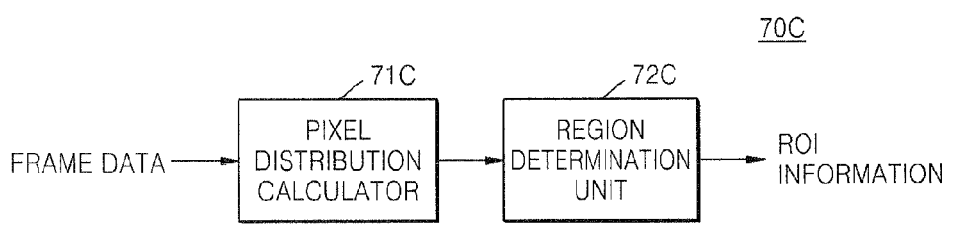
FIG. 11 is a block diagram of an ROI detection unit according to an exemplary embodiment of the inventive concept.

Structures of ROI detection units as illustrated in FIGS. 6 to 8 according to embodiments of the inventive concept are illustrated in FIGS. 9 to 11.

Referring to FIG. 9, an ROI detection unit 70A according to an exemplary embodiment of the inventive concept includes an image complexity calculator 71A and a region determination unit 72A.

The image complexity calculator 71A calculates image complexity by counting the number of pixels detected as interfaces in units of macroblocks of input frame data. Here, the 'image complexity' means a criterion representing whether the degree of a change in an image is large. To this end, the image complexity calculator 71A can calculate image complexity by using an interface detecting method, e.g., a canny edge detector.

The region determination unit 72A may determine as a region of interest either: a region of the image, the number of pixels detected as interfaces in units of macroblocks of input frame data of which is greater than an initially set first threshold; or a region of the image, the values of pixels of which are greater than an initially set second threshold from among pixels around the interfaces.

Referring to FIG. 10, an ROI detection unit 70B according to an exemplary embodiment of the inventive concept may include a motion amount calculator 71B and a region determination unit 72B.

The motion amount calculator 71B may detect a motion vector in units of macroblocks of input frame data, and calculate the amount of motion by respectively squaring horizontal components and vertical components of the detected motion vectors and calculating the square root of the sum of the result of the squaring.

The region determination unit 72B can determine as a region of interest either: a region of the image, the calculated amount of motion of which is greater than an initially set third threshold; or a region of the image, the amount of motion of which is equal to or greater than an initially set third threshold.

Referring to FIG. 11, an ROI detection unit 70C according to an exemplary embodiment of the inventive concept may include a pixel distribution calculator 71C and a region determination unit 72C.

The pixel distribution calculator 71C may obtain a pixel distribution by calculating an accumulated number of each pixel value by applying a histogram intersection to input frame data.

The region determination unit 72C can determine as a region of interest either: a region of the image, the pixel distribution of which is greater than an initially set fifth threshold; or a region of the image, the pixel distribution of which is equal to or greater than an initially set sixth threshold from among pixel distributions calculated in units of macroblocks of the image.

According to an exemplary embodiment of the inventive concept, ROI information may be obtained from a combination of at least two from among the complexity of an input image, the amount of motion of the input image, and a pixel distribution of the input image.

Figure 12:
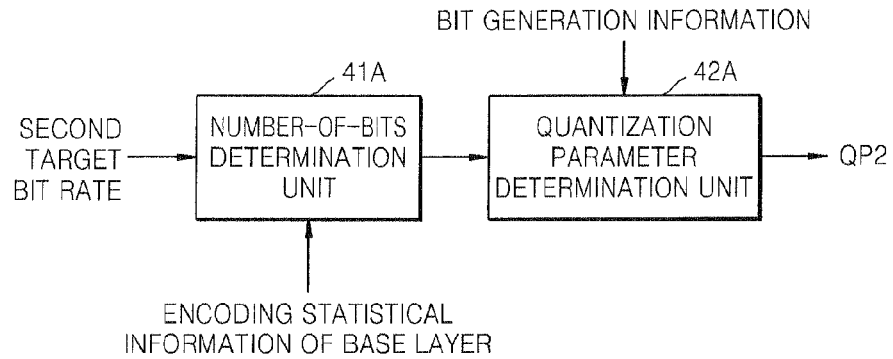
FIG. 12 is a block diagram of a second rate controller included in an enhancement layer encoder, according to an exemplary embodiment of the inventive concept.
Figure 13:
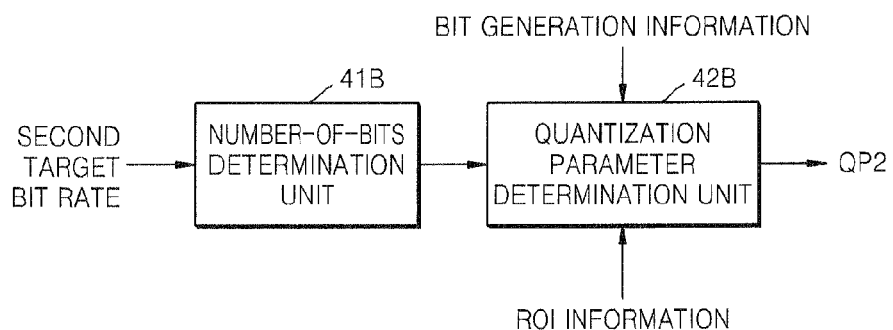
FIG. 13 is a block diagram of a second rate controller included in an enhancement layer encoder, according to an exemplary embodiment of the inventive concept.
Figure 14:
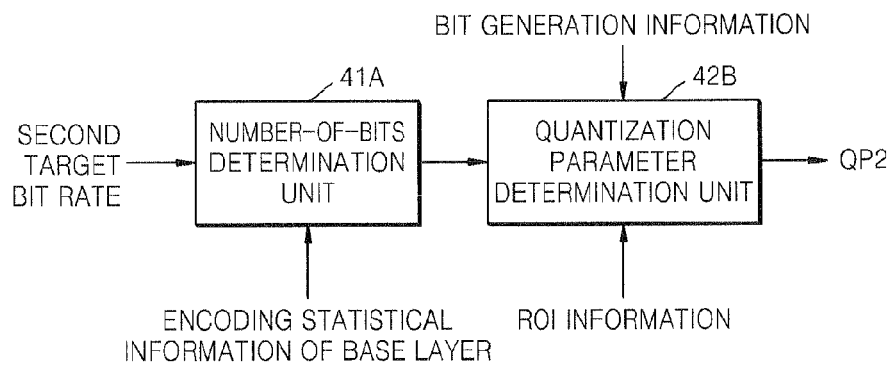
FIG. 14 is a block diagram of a second rate controller included in an enhancement layer encoder, according to an exemplary embodiment of the inventive concept.

FIGS. 12 to 14 are block diagrams of second rate controllers, such as shown in the enhancement layer encoders 122A to 122F of FIGS. 3 to 8, according to embodiments of the inventive concept.

Referring to FIG. 12, a second rate controller according to an exemplary embodiment of the inventive concept includes a number-of-bits determination unit 41A and a quantization parameter determination unit 42A.

The number-of-bits determination unit 41A determines a target number of bits of each of regions of an enhancement layer, based on encoding statistical information generated at a base layer.

For example, the number-of-bits determination unit 41A may determine a target number of bits in units of macroblocks of the enhancement layer, based on numbers of bits generated in units of macroblocks of the base layer. When a spatial resolution of the base layer is different from that of the enhancement layer, the numbers of bits generated in units of macroblocks of the base layer may be up-scaled or down-scaled and then a result of up or down scaling the numbers of bits the enhancement layer may be determined as target numbers of bits for the macroblocks of the enhancement layer.

Specifically, when the resolution of the enhancement layer is higher than that of the base layer, a result of up-scaling the numbers of bits generated in units of macroblocks of the base layer to be appropriate for the resolution of the enhancement layer is determined as target numbers of bits of the macroblocks of the enhancement layer. When the resolution of the enhancement layer is lower than that of the base layer, a result of down-scaling the numbers of bits generated in units of macroblocks of the base layer to be appropriate for the resolution of the enhancement layer is determined as target numbers of bits of the macroblocks of the enhancement layer.

If the resolution of the enhancement layer is equal to that of the base layer, the numbers of bits generated in units of macroblocks of the base layer may be determined as target numbers of bits of the macroblocks of the enhancement layer.

The number-of-bits determination unit 41A can calculate a target number of bits $T_{mb}(i)$ assigned to an $i^{th}$ macroblock of the enhancement layer by using the following equation (where 'i' denotes an integer that is equal to or greater than '1'):

$$T_{mb}[i] = T_{pic} \times (MB\_BITS[i] / PIC\_BITS\_SUM), \quad \text{[Equation 1]}$$

wherein '$T_{pic}$' denotes a target number of bits assigned to a picture of the enhancement layer, 'MB_BITS(i)' denotes a number of bits generated in a macroblock of the base layer matching the $i^{th}$ macroblock of the enhancement layer, and 'PIC_BITS_SUM' denotes the sum of numbers of bits generated in all macroblocks of a picture of the base layer.

As an alternative example, the number-of-bits determination unit 41A may determine target numbers of bits of the macroblocks of the enhancement layer, based on an SAD between pixels of a current frame and a predicted frame that are calculated in the macroblocks of the base layer.

Specifically, the number-of-bits determination unit 41A may calculate a target number of bits $T_{mb}(i)$ assigned to the $i^{th}$ macroblock of the enhancement layer by using the following equation (where 'i' denotes an integer that is equal to or greater than '1'):

$$T_{mb}[i] = T_{pic} \times (\text{MB\_SAD}[i]/\text{PIC\_SAD\_SUM}) \quad \text{[Equation 2]}$$

wherein '$T_{pic}$' denotes a target number of bits assigned to a picture of the enhancement layer, 'MB_SAD(i)' denotes an SAD between pixels of a current frame and a predicted frame calculated in a macroblock of the base layer that matches the $i^{th}$ macroblock of the enhancement layer, and 'PIC_SAD_SUM' denotes an SAD between pixels of a current frame and a predicted frame calculated in all macroblocks of a picture of the base layer.

As another example, the number-of-bits determination unit 41A may determine a target number of bits of a macroblock of the enhancement layer, based on a number of bits generated when a macroblock of the base layer matching the macroblock of the enhancement layer is encoded and an SAD between pixels of a current frame and a predicted frame that are calculated in the matching macroblock of the base layer.

Specifically, the number-of-bits determination unit 41A may calculate a target number of bits $T_{mb}(i)$ assigned to the $i^{th}$ macroblock of the enhancement layer by using the following equation (where 'i' denotes an integer that is equal to or greater than '1'):

$$T_{mb}(i) = (1-W) \times T_{pic} \times (\text{MB\_BITS}[i]/\text{PIC\_BITS\_SUM}) + W \times T_{pic} \times (\text{MB\_SAD}[i]/\text{PIC\_SAD\_SUM}) \quad \text{[Equation 3]}$$

wherein '$T_{pic}$' denotes a target number of bits assigned to a picture of the enhancement layer, 'MB_BITS(i)' denotes a number of bits generated in a macroblock of a first layer matching the $i^{th}$ macroblock of the enhancement layer, 'PIC_BITS_SUM' denotes the sum of numbers of bits generated in all macroblocks of a picture of the base layer, 'MB_SAD(i)' denotes an SAD between pixels of a current frame and a predicted frame calculated in a macroblock of the base layer that matches the $i^{th}$ macroblock of the enhancement layer, 'PIC_SAD_SUM' denotes an SAD between pixels of a current frame and a predicted frame calculated in all macroblocks of a picture of the base layer, and 'W' denotes a weighted coefficient that is greater than '0' and less than '1'.

As another example, the number-of-bits determination unit 41A may determine target numbers of bits assigned to frames of the enhancement layer, based on at least one from among the complexity of a reference size calculated at the base layer and a ratio of target numbers of bits assigned to a frame to a target number of bits assigned to a group of pictures in the base layer.

Figure 19A:
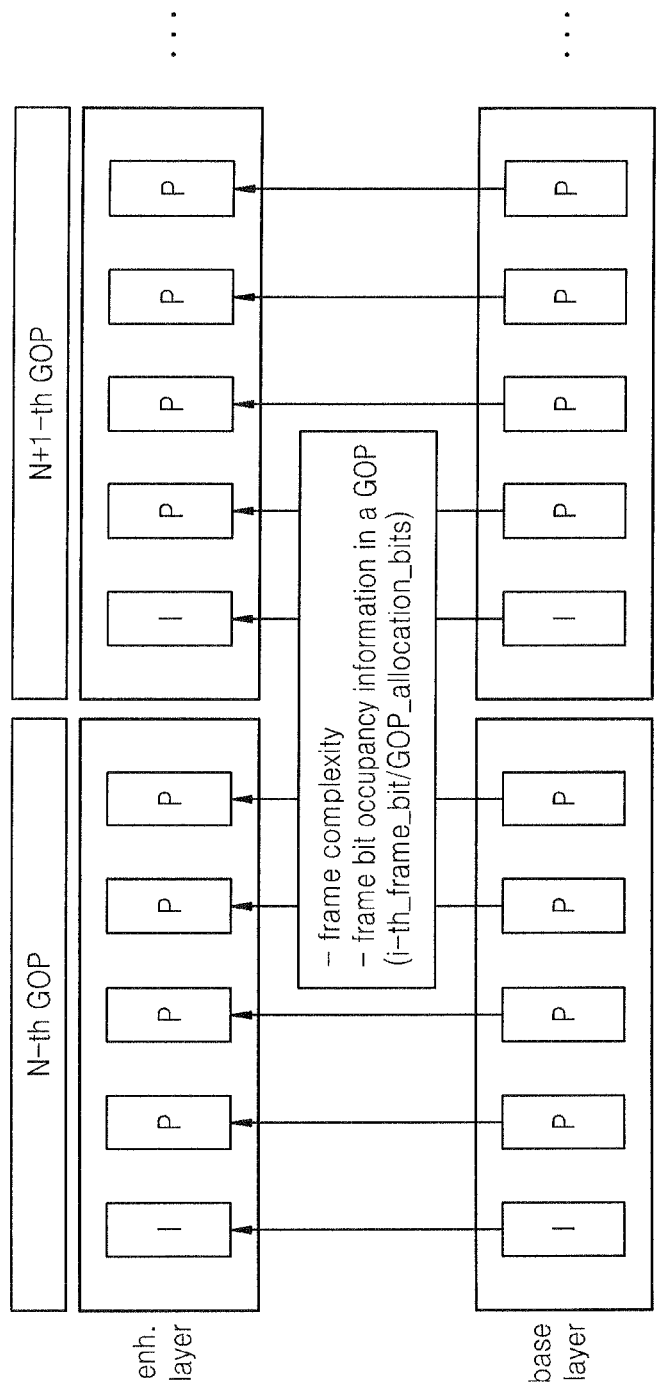

FIGS. 19A and 19B are conceptual diagrams illustrating processes of determining a target number of bits for a frame of an enhancement layer by using encoding statistical information of a base layer, performed by a multi-layered encoder, according to embodiments of the inventive concept.

FIG. 19A illustrates a process of encoding a GOP consisting of I pictures and P pictures. FIG. 19B illustrates a process of encoding a GOP consisting of I pictures, B pictures, and P pictures.

Referring to FIGS. 19A and 19B, frame complexity calculated when the base layer is encoded and frame bit occupancy information of a picture group are transmitted to the enhancement layer so that they may be used to determine target numbers of bits assigned to frames of the enhancement layer.

Specifically, the number-of-bits determination unit 41A of FIG. 12 can calculate a target number of bits $T_{ENH\_frame}[i]$ assigned to an $i^{th}$ frame of the enhancement layer by using the following equation (where 'i' denotes an integer that is equal to or greater than '1'):

$$T_{ENH\_frame}[i] = \quad \text{[Equation 4]}$$
$$\text{GOP\_ALLOC\_BITS}_{ENH} \times \text{WEIGHT}\left( \text{PICTURE\_TYPE}, \text{COMPLEXITY}_{BASE}[i], \frac{\text{FRAME\_BITS}_{BASE}[i]}{\text{GOP\_ALLOC\_BITS}_{BASE}} \right)$$

wherein 'GOP_ALLOC_BITS$_{ENH}$' denotes a target number of bits assigned to a picture group of the enhancement layer, 'PICTURE_TYPE' denotes a picture type, 'COMPLEXITY$_{BASE}$[i]' denotes the complexity of an $i^{th}$ frame of the base layer, 'GOP_ALLOC_BITS$_{BASE}$' denotes a number of bits generated in a picture group of the base layer, and 'FRAME_BITS$_{BASE}$[i]' denotes a number of bits generated in the $i^{th}$ frame of the base layer.

The denominator of Equation 4 is a value calculated based on a result of dividing the picture type, the complexity of a frame of the base layer, and the number of bits generated in the $i_{th}$ frame of the base layer by the number of bits generated in the picture group of the base layer.

For example, in Equation 4, a FRAME_WEIGHT function may be determined in such a manner that the denominator may be smaller in the case of an I picture than in the case of a P picture in the picture group and the greater the frame complexity of the base layer, the smaller the denominator is.

The quantization parameter determination unit 42A of FIG. 12 determines a second quantization parameter QP2 according to the difference between the target number of bits $T_{ENH\_frame}[i]$ determined by the number-of-bits determination unit 41A and the number of bits that are actually generated when the enhancement layer is entropy coded. For example, the actually generated number of bits may be obtained based on information about bits generated when the enhancement layer is entropy coded.

An initial quantization parameter may be assigned in units of macroblocks of the enhancement layer, based on a target bit rate of the enhancement layer. The same quantization parameter may be assigned as an initial quantization parameter to all the macroblocks of the enhancement layer.

The quantization parameter determination unit 42A reduces a quantization parameter assigned to a subsequent macroblock when a target number of bits assigned to the current macroblock is greater than the number of bits that are actually generated when the enhancement layer is entropy coded. The quantization parameter determination unit 42A increases the quantization parameter assigned to the subsequent macroblock when the target number of bits assigned to the current macroblock is less than the number of bits that are actually generated when the enhancement layer is entropy coded. The quantization parameter determination unit 42A maintains the quantization parameter assigned to the subsequent macroblock when the target number of bits assigned to the current macroblock is equal to the number of bits that are actually generated when the enhancement layer is entropy coded.

As described above, the quantization parameter determination unit 42A finally determines the second quantization parameter QP2 to be applied to a subsequent macroblock, based on a result of encoding the current macroblock of the enhancement layer. The enhancement layer may be quantized by using the finally determined second quantization parameter QP2.

Referring to FIG. 13, a second rate controller according to an exemplary embodiment of the inventive concept includes a number-of-bits determination unit 41B and a quantization parameter determination unit 42B.

The number-of-bits determination unit 41B determines a target number of bits in units of a target picture, based on a target number of bits assigned to a picture or a picture group of an enhancement layer. In this case, encoding statistical information generated at a base layer may not be used.

Figure 24:
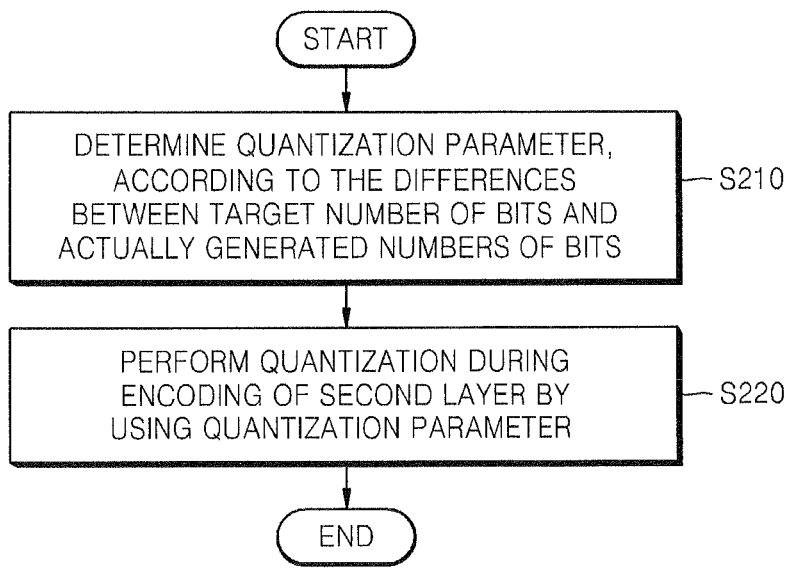
FIG. 24 is a flowchart illustrating an operation of determining a quantization parameter of a second layer, which is included in a rate control method for multi-layered video coding, according to an exemplary embodiment of the inventive concept.

The quantization parameter determination unit 42B may assign a quantization parameter to the enhancement layer, based on ROI information generated in a video frame encoded at the base layer. For example, a macroblock of the base layer corresponding to the location of a current macroblock that is to be encoded at the enhancement layer may be detected, and a quantization parameter may be assigned to the enhancement layer based on ROI information of the detected macroblock of the base layer. For example, as illustrated in FIG. 24, a quantization parameter in a region of interest may be set to be smaller than that in a region of non-interest.

The quantization parameter determination unit 42B may finally determine a second quantization parameter QP2 to be assigned to a subsequent macroblock by adjusting a quantization parameter assigned to the subsequent macroblock, according to the difference between a target number of bits assigned to the current macroblock and the number of bits that are actually generated by entropy coding the current macroblock. For example, the quantization parameter assigned to the subsequent macroblock is reduced when the target number of bits is greater than the number of bits, and is increased when the target number of bits is less than the (actual) number of bits. The quantization parameter assigned to the subsequent macroblock is maintained if the target number of bits is equal to the (actual) number of bits. A quantization parameter assigned based on the ROI information is used when a first macroblock of each of frames is encoded.

Referring to FIG. 14, a second rate controller according to an exemplary embodiment of the inventive concept includes a number-of-bits determination unit 41A and a quantization parameter determination unit 42B.

The number-of-bits determination unit 41A is the same as the number-of-bits determination unit 41A of FIG. 12, and the quantization parameter determination unit 42B is the same as the quantization parameter determination unit 42B of FIG. 13.

Thus, the number-of-bits determination unit 41A determines a target number of bits in units of reference sizes of an enhancement layer, based on encoding statistical information generated at a base layer. For example, a target number of bits $T_{mb}(i)$ assigned to an $i^{th}$ macroblock of the enhancement layer can be calculated according to one of Equations 1 to 3.

Also, the number-of-bits determination unit 41A can calculate a target number of bits $T_{ENH\_frame}[i]$ assigned to an $i^{th}$ frame of the enhancement layer according Equation 1.

The quantization parameter determination unit 42B can assign quantization parameters to macroblocks of the enhancement layer, based on ROI information generated in a video frame encoded at the base layer.

The quantization parameter determination unit 42B adjusts a quantization parameter assigned to a subsequent macroblock according to the difference between a target number of bits assigned to the current macroblock based on the encoding statistical information of the base layer and the number of bits that are actually generated when the current macroblock is entropy coded. Operations of the quantization parameter determination unit 42B are the same as those of the quantization parameter determination unit 42B of FIG. 13 and are thus will not be described again here.

Figure 15:
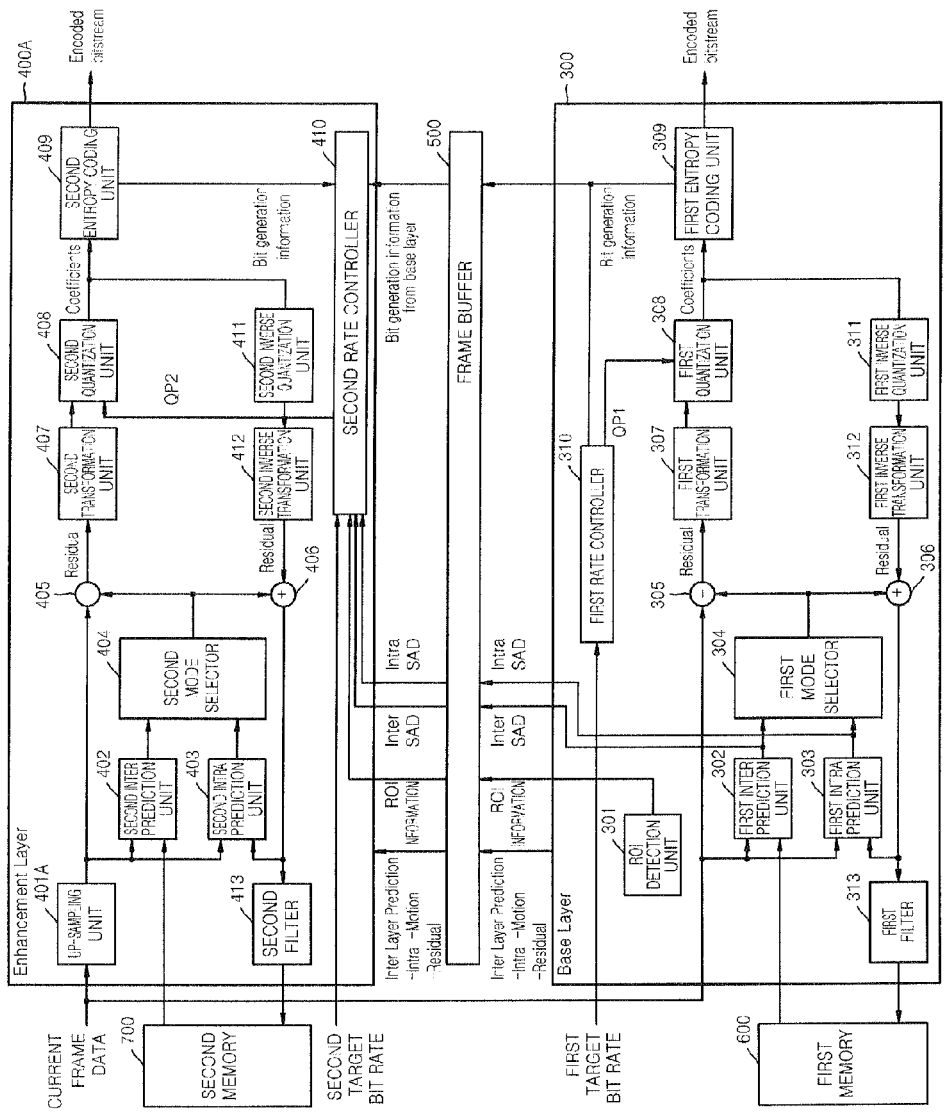
FIG. 15 is a detailed block diagram of a multi-layered encoder according to an exemplary embodiment of the inventive concept.
Figure 16:
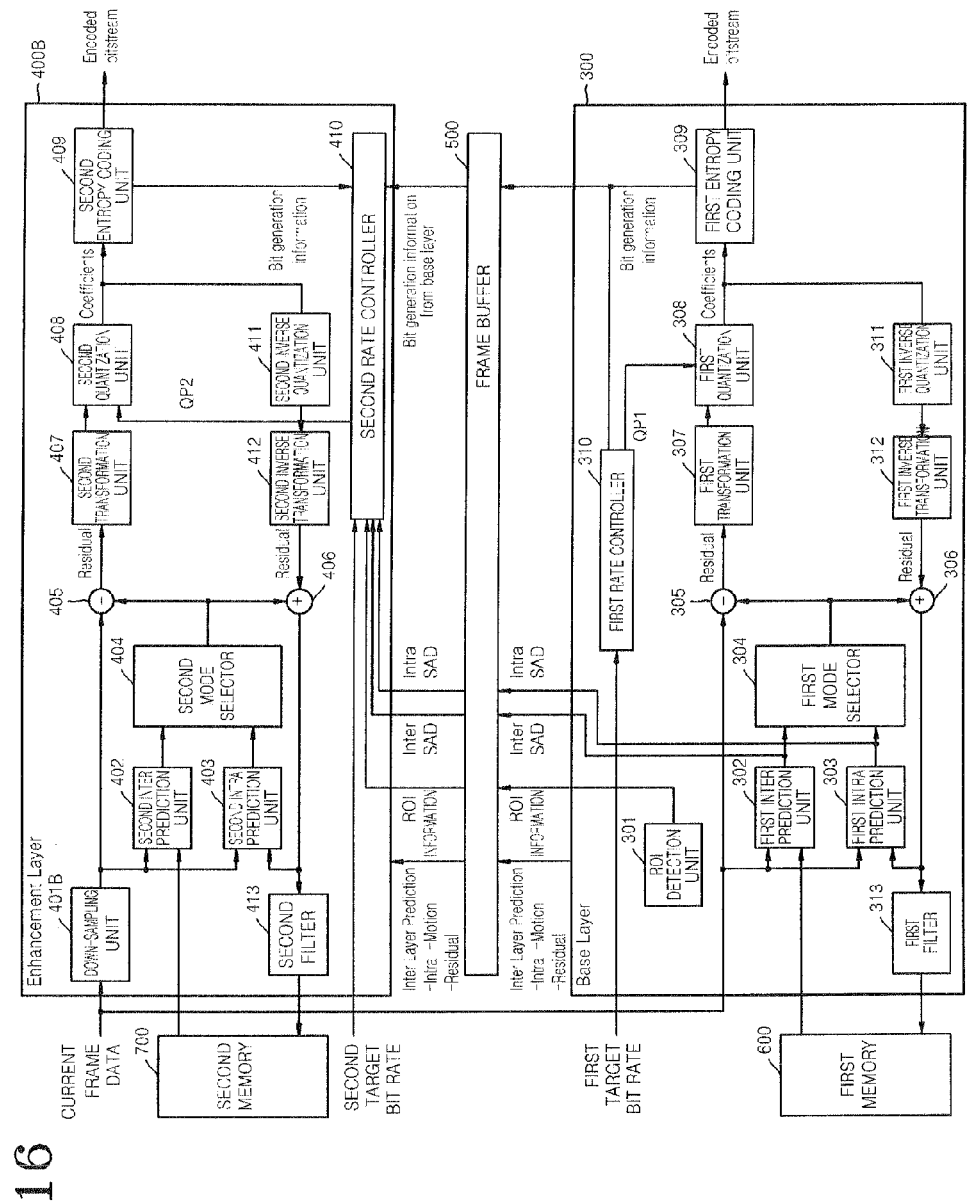
FIG. 16 is a detailed block diagram of a multi-layered encoder according to an exemplary embodiment of the inventive concept.

FIGS. 15 and 16 are detailed block diagrams of multi-layered encoders according to embodiments of the inventive concept.

Referring to FIG. 15, the multi-layered encoder includes a base layer encoder 300, an enhancement layer encoder 400A, a frame buffer 500, a first memory 600, and a second memory 700.

The base layer encoder 300 includes an ROI detection unit 301, a first inter prediction unit 302, a first intra prediction unit 303, a first mode selector 304, a first subtractor 305, a first adder 306, a first transformation unit 307, a first quantization unit 308, a first entropy coding unit 309, a first rate controller 310, a first inverse quantization unit 311, a first inverse transformation unit 312, and a first filter 313.

The enhancement layer encoder 400A includes an up-sampling unit 401, a second inter prediction unit 402, a second intra prediction unit 403, a second mode selector 404, a second subtractor 405, a second adder 406, a second transformation unit 407, a second quantization unit 408, a second entropy coding unit 409, a second rate controller 410, a second inverse quantization unit 411, a second inverse transformation unit 412, and a second filter 413.

The multi-layered encoder of FIG. 15 is an example of a multi-layered encoder that supports spatial scalability according to an exemplary embodiment of the inventive concept. In the multi-layered encoder, the base layer encoder 300 encodes video data having an original image resolution, and the enhancement layer encoder 400A encodes video data, the resolution of which is higher than the original image resolution.

For example, when the resolution of original video data has a CIF, the base layer encoder 300 encodes the original video data having a CIF resolution. The enhancement layer encoder 400A encodes SD or HD video data, the resolution of which is increased through up-sampling.

First, encoding performed by the base layer encoder 300 will be described.

The ROI detection unit 301 obtains ROI information representing a region of interest by detecting a region of interest from input frame data. For example, the ROI detection unit 301 may be embodied as one of the ROI detection units 70A to 70C illustrated in FIGS. 9 to 11.

The first inter prediction unit 302 generates motion information by comparing a block of a current frame with a block of at least one frame adjacent to the current frame, and generates a predicted block of the current block, which is to be encoded in the current frame, based on the generated motion information. The at least one adjacent frame may be provided from the first memory 600 that stores data restored from a previously encoded block.

The first intra prediction unit 303 generates a predicted block, based on at least one encoded block of a base layer in a frame including the block that is being currently coded.

The first mode selector 304 outputs the predicted block generated by the first intra prediction unit 303 when the picture type of the frame including the block being currently coded is an I type, and outputs the predicted block generated by the first inter prediction unit 302 when the picture type of the frame including the block being currently coded is a P or B type.

The first subtractor 305 generates a residual block by subtracting the predicted block output from the first mode selector 304 from the current block of the current frame. The 'residual block' means a set of the differences between pixel values of the current frame and the predicted block. For example, the residual block may be expressed in a two-dimensional (2D) block format, e.g., a 2D matrix or an array of pixel values.

The first transformation unit 307 generates residual transformation coefficients by transforming the residual block. The first transformation unit 307 transforms the set of the differences between pixel values in a time domain into residual transformation coefficients representing energies of the differences between pixel values in a frequency domain. To this end, for example, DCT, integral transformation, directional transformation, wavelet transformation, or a combination thereof may be performed.

The first quantization unit 308 quantizes the residual transformation coefficients by using a first quantization parameter QP1 determined by the first rate controller 310. The first quantization parameter QP1 is a factor indicating the basic degree of quantization to be performed. The rate of compression is high when the first quantization parameter QP1 increases, and the rate of compression is low when the first quantization parameter QP1 decreases. When the first quantization parameter QP1 increases, the number of bits generated when coding is performed in units of blocks.

The first inverse quantization unit 311 inversely quantizes the quantized residual transformation coefficients to restore the residual transformation coefficients.

The first inverse transformation unit 312 inversely transforms the restored residual transformation coefficients to restore the residual block.

The first adder 306 restores a video block by combining the restored residual block and the predicted block received from the first mode selector 304.

The restored video block is deblocking filtered by the first filter 313 and is then stored in the first memory 600. Video blocks stored in the first memory 600 may be used as reference frame data to perform inter prediction.

The first entropy coding unit 309 entropy codes the quantized residual transformation coefficients into a bitstream by performing variable-length coding (VLC), arithmetic coding, or any of other entropy coding techniques. The first entropy coding unit 309 outputs bit generation information generated when entropy coding is performed. An example of the bit generation information may be information about a number of bits generated in units of regions of the input frame data.

The first rate controller 310 determines the first quantization parameter QP1 according to the difference between a target number of bits set for a block at a first target bit rate corresponding to the resolution of the base layer and the (actual) number of bits that are actually generated at the base layer by the first entropy coding unit 309. For example, the first quantization parameter QP1 assigned to a subsequent block is reduced if the target number of bits is greater than the actually generated number of bits and is increased if the target number of bits is less than the actually generated number of bits. The first quantization parameter QP1 assigned to the subsequent block is maintained if the target number of bits is equal to the actually generated number of bits. An initially set quantization parameter may be assigned to blocks of the base layer.

The base layer encoder 300 generates encoding statistical information based on the result of performing encoding. For example, the encoding statistical information may include information about a number of bits generated in units of blocks, information about an inter SAD generated through inter prediction, information about an inter SAD generated through intra prediction, and the like.

The encoding statistical information generated by the base layer encoder 300 is stored in the frame buffer 500. Intra picture information, motion information, and residual information generated to perform inter-layer prediction when the input frame data is encoded in the base layer encoder 300 are also stored in the frame buffer 500.

Next, an encoding process performed by the enhancement layer encoder 400A is described below.

For inter-layer prediction, the enhancement layer encoder 400A performs encoding by using reference information generated at the base layer, e.g., intra picture information, motion information, and residual information.

Also, the enhancement layer encoder 400A controls a bit rate by using the encoding statistical information generated based on the result of performing encoding at the base layer and/or ROI information.

The up-sampling unit 401A up-samples video frame data to produce video frame data having a resolution defined according to an enhancement layer.

The second inter prediction unit 402 generates a predicted block of a block of the current frame, which is to be encoded, based on a block of an up-sampled current frame, blocks of at least one adjacent frame of the base layer and the enhancement layer, and motion information generated at the base layer. Adjacent frames needed to generate the predicted block are provided from the first memory 600, and the reference information generated at the base layer is provided from the frame buffer 500.

The second intra prediction unit 403 generates a predicted block, based on at least one encoded block of a base layer and an enhancement layer of a frame including a block that is being currently coded.

The second mode selector 404 selects and outputs the predicted block generated by the second intra prediction unit 403 when the frame including the block that is being currently coded is an I type, and selects and outputs the predicted block generated by second inter prediction unit 402 when the frame including the block that is being currently coded is a P type or a B type.

The second subtractor 405 generates a residual block by subtracting the predicted block received from the second mode selector 304 from a block of a current frame. The 'residual block' means a set of the differences between pixel values of the (actual) block of the current frame and the predicted block. For example, the residual block may be expressed in a 2D block format, e.g., a 2D matrix or an array of pixel values.

The second transformation unit 407 generates residual transformation coefficients by transforming the residual block. The second transformation unit 407 transforms a set of the differences between pixel values in a time domain into residual transformation coefficients representing energies of the differences between pixel values in a frequency domain. To this end, for example, DCT, integral transformation, directional transformation, wavelet transformation, or a combination thereof may be performed.

The second quantization unit 408 may quantize the residual transformation coefficients by using a second quantization parameter QP2 determined by the second rate controller 410. The second quantization parameter QP2 is a factor indicating a basic degree of quantization to be performed. The rate of compression is high when the second quantization parameter QP2 increases, and is low when the second quantization parameter QP2 decreases. When the second quantization parameter QP2 increases, a number of bits generated when coding processing is performed in units of blocks decreases.

The second inverse quantization unit 411 inversely quantizes the quantized residual transformation coefficients to restore the residual transformation coefficients.

The second inverse transformation unit 412 inversely transforms the restored residual transformation coefficients to restore the residual block.

The second adder 406 restores a video block by combining the restored residual block and the predicted block received from the second mode selector 404.

The restored video block is deblocking filtered by the second filter 413 and is then stored in the second memory 700. Video blocks stored in the second memory 700 may be used as reference frame data to perform inter prediction.

The second entropy coding unit 409 entropy codes the quantized residual transformation coefficients into a bitstream by performing VLC, arithmetic coding, or any of other entropy coding techniques. The second entropy coding unit 409 outputs bit generation information generated when entropy coding is performed, and supplies it to the second rate controller 410.

The number of bits that are actually generated when entropy coding is performed is detected based on the bit generation information generated by the second entropy coding unit 409.

The second rate controller 410 determines a target number of bits for a macroblock and/or a frame, based on the encoding statistical information of the base layer read from the frame buffer 500. For example, a target number of bits $T_{mb}(i)$ to be assigned to an $i^{th}$ macroblock of the enhancement layer can be determined according to Equations 1 to 3. The second rate controller 410 can determine a target number of bits $T_{ENH\_frame}[i]$ to be assigned to an $i^{th}$ frame of the enhancement layer, according to Equation 4.

Also, the second rate controller 410 can assign quantization parameters to macroblocks of the enhancement layer, based on ROI information read from the frame buffer 500. For example, as illustrated in FIG. 24, a quantization parameter in a region of interest may be set to be less than that in a region of non-interest.

Also, the second rate controller 410 adjusts a quantization parameter assigned to a subsequent macroblock according to the difference between a target number of bits assigned to the current macroblock and the (actually generated) number of bits that are actually generated when the current macroblock is entropy coded. The actually generated number of bits may be detected based on the bit generation information generated by the entropy coding unit 409.

For example, the first quantization parameter QP1 assigned to a subsequent block is reduced when the target number of bits is greater than the actually generated number of bits and is increased when the target number of bits is less than the actually generated number of bits. The first quantization parameter QP1 assigned to the subsequent block is maintained when the target number of bits is equal to the actually generated number of bits. An initially set quantization parameter may be assigned to blocks of the base layer.

For example, a quantization parameter assigned to a subsequent macroblock is reduced if the target number of bits is greater than the actually generated number of bits, and is increased if the target number of bits is less than the actually generated number of bits. The quantization parameter assigned to a subsequent macroblock is maintained if the target number of bits is equal to the actually generated number of bits. A quantization parameter assigned according to the ROI information is used when a first macroblock of each of frames is encoded.

FIG. 16 is a detailed block diagram of a multi-layered encoder according to an exemplary embodiment of the inventive concept. Referring to FIG. 16, the multi-layered encoder includes a base layer encoder 300, an enhancement layer encoder 400B, a frame buffer 500, a first memory 600, and a second memory 700.

The base layer encoder 300 includes an ROI detection unit 301, a first inter prediction unit 302, a first intra prediction unit 303, a first mode selector 304, a first subtractor 305, a first adder 306, a first transformation unit 307, a first quantization unit 308, a first entropy coding unit 309, a first rate controller 310, a first inverse quantization unit 311, a first inverse transformation unit 312, and a first filter 313.

The enhancement layer encoder 400B includes a down-sampling unit 401B, a second inter prediction unit 402, a second intra prediction unit 403, a second mode selector 404, a second subtractor 405, a second adder 406, a second transformation unit 407, a second quantization unit 408, a second entropy coding unit 409, a second rate controller 410, a second inverse quantization unit 411, a second inverse transformation unit 412, and a second filter 413.

The multi-layered encoder of FIG. 16 is an example of a multi-layered encoder supporting spatial scalability. In the multi-layered encoder of FIG. 16, the base layer encoder 300 encodes video data having an original image resolution, and the enhancement layer encoder 400A encodes video data, the resolution of which is lower than the original image resolution.

For example, when the resolution of the original video data is high definition (HD), the base layer encoder 300 encodes the original video data having an HD resolution. The enhancement layer encoder 400B encodes SD or CIF video data, the resolution of which is reduced through down-sampling.

The multi-layered encoder of FIG. 16 encodes video data, the resolution of which is lower than on a base layer, on an enhancement layer, whereas the multi-layered encoder of FIG. 15 encodes video data, the resolution of which is higher than on the base layer, on the enhancement layer.

In the enhancement layer encoder 400A of the multi-layered encoder illustrated in FIG. 15, frame data is up-sampled to produce frame data having a higher resolution by the up-sampling unit 401A, and is then encoded.

In contrast, in the enhancement layer encoder 400B of the multi-layered encoder illustrated in FIG. 16, frame data is down-sampled by the down-sampling unit 401B to produce frame data having a lower resolution and is then encoded.

Thus, the base layer encoder 300 of the multi-layered encoder illustrated in FIG. 16 has the same structure and operation as those of the base layer encoder 300 of FIG. 15. The structure and operation of the enhancement layer encoder 400B of the multi-layered encoder illustrated in FIG. 16 are the same as those of the enhancement layer encoder 400A of the multi-layered encoder illustrated in FIG. 15, except that the down-sampling unit 401B is included instead of the up-sampling unit 401A of FIG. 15. Thus, the structure and operation of the enhancement layer encoder 400B are the same as those of the enhancement layer encoder 400A and will not be described again here.

The blocks referred to in FIGS. 15 and 16 may be macroblocks or may have different sizes than those of macroblocks. For example, in FIGS. 15 and 16, the first memory 600 and the second memory 700 may be respectively disposed in the base layer encoder 300 and the enhancement layer encoder 400A or 400B.

If the up-sampling unit 401A is omitted in the enhancement layer encoder 400A of the multi-layered encoder of FIG. 15 so that current frame data may be directly supplied to the second inter prediction unit 402, the second intra prediction unit 403, and the second subtractor 405, then the multi-layered encoder of FIG. 15 may be embodied as a multi-layered encoder that supports quality scalability.

Next, a rate control method for multi-layered video coding, performed by a video encoding apparatus according to an exemplary embodiment of the inventive concept will be described with reference to the flowchart of FIG. 23.

Figure 23:
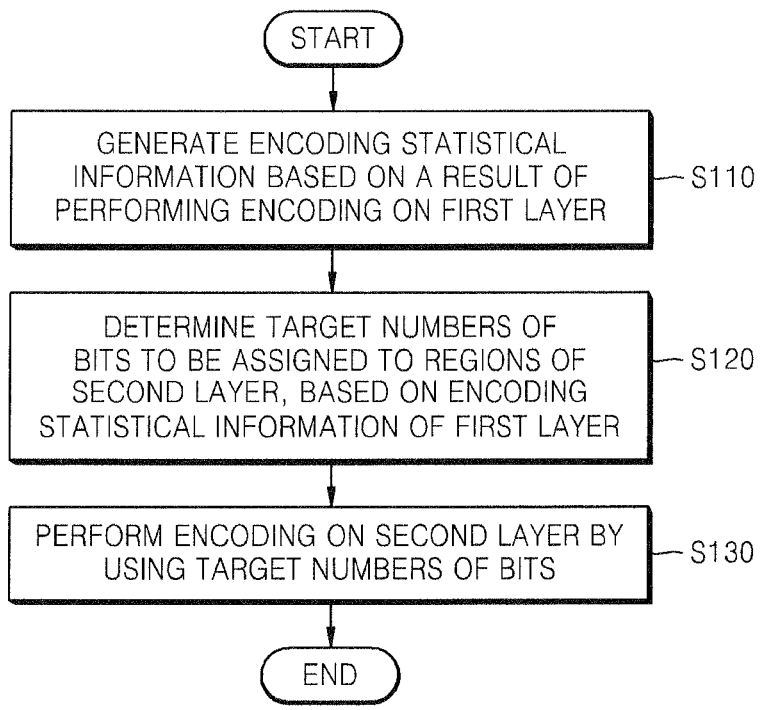
FIG. 23 is a flowchart illustrating a rate control method for multi-layered video coding, according to an exemplary embodiment of the inventive concept.

Referring to FIG. 23, first, a multi-layered encoder generates encoding statistical information based on the result of performing encoding on a first layer (step S110). The first layer may be a base layer defined in the ITU-T H.264/MPEG-4 Part 10 AVC standards. Otherwise, the first layer may be one of enhancement layers defined in the ITU-T H.264/MPEG-4, and Part 10 AVC standards. The first layer is preferably lower resolution than a second layer. Thus, the first layer may be referred to as a lower layer, and the second layer may be referred to as an upper layer.

For example, the encoding statistical information may include at least one from among information about the number of bits generated in units of regions of the first layer, information about an SAD between pixel values of a current frame and a predicted frame, and information about the complexities of the regions of the first layer. Here, the regions may include at least one from among GOPs, frames, and macroblocks.

Then, the multi-layered encoder determines target numbers of bits to be respectively assigned to regions of the second layer, based on the encoding statistical information of the first layer (step S120). For example, the multi-layered encoder may determine a target number of bits for a macroblock and/or a frame, based on the encoding statistical information of the first layer corresponding to a location of a macroblock that is to be encoded at the second layer, according to Equations 1 to 4. In Equations 1 to 4, the base layer corresponds to the first layer and the enhancement layer corresponds to the second layer.

Then, the multi-layered encoder encodes the second layer by using the target numbers of bits determined in step S120 (step S130). The multi-layered encoder encodes the second layer by adjusting a bit rate based on the target numbers of bits determined in units of the regions of the second layer.

Step S130 included in the rate control method of FIG. 23 according to an exemplary embodiment of the inventive concept is particularly illustrated in FIG. 24.

Referring to FIG. 24, the multi-layered encoder determines a quantization parameter to be used to encode the second layer, according to the differences between the target number of bits assigned to the regions of the second layer and the numbers of bits that are respectively generated when the regions of the second layer are encoded (step S210). The multi-layered encoder determines a quantization parameter according to the differences between a target numbers of bits determined for a macroblock and/or a frame of the second layer and the number of bits that are actually generated when the second layer is entropy coded. For example, a quantization parameter assigned to a macroblock that is to be processed is reduced if a target number of bits determined based on the encoding statistical information of the base layer is greater than an actually generated number of bits, and is increased if the target number of bits determined based on the encoding statistical information of the base layer is less than the actually generated number of bits. The quantization parameter assigned to the macroblock that is to be processed is maintained if the target number of bits determined based on the encoding statistical information of the base layer is equal to the actually generated number of bits.

Then, the multi-layered encoder performs quantization during the encoding of the second layer by using the quantization parameter determined in step S210 (step S220). The multi-layered encoder quantizes residual transformation coefficients generated during the encoding of the second layer by using the determined quantization parameter.

FIG. 25 is a flowchart illustrating an operation of determining a quantization parameter of a second layer, which is included in a rate control method for multi-layered video coding, according to an exemplary embodiment of the inventive concept.

Referring to FIG. 25, a multi-layered encoder generates ROI information about an input image (step S310). For example, the multi-layered encoder may generate the ROI information by using the ROI detection unit 70 illustrated in one of FIG. 6 to FIG. 8.

Then, the multi-layered encoder assigns a quantization parameter to a second layer, based on the ROI information generated in step S310 (step S320). The multi-layered encoder determines quantization parameters to be assigned to regions of the second layer, based on ROI information generated at a first layer. For example, a macroblock of the first layer corresponding to the current macroblock of the second layer, which is to be encoded, may be detected, and a quantization parameter may be assigned to the macroblock of the second layer, which is to be encoded, by using ROI information about the detected macroblock of the first layer. As illustrated in FIG. 24, the quantization parameter in a region of interest may be set to be less than the quantization parameter in a region of non-interest.

Then, the multi-layered encoder performs quantization on the second layer, based on the quantization parameter assigned in operation 320 (step S330). For example, the multi-layered encoder adjusts the quantization parameter assigned to a subsequent macroblock according to the difference between a target number of bits assigned to the current macroblock of the second layer and the number of bits generated when the current macroblock is entropy coded, and quantizes residual transformation coefficients generated during the encoding of the second layer by using the adjusted quantization parameter.

Next, a rate control method for multi-layered video coding, performed by a video encoding apparatus according to an exemplary embodiment of the inventive concept will now be described with reference to FIG. 26.

First, a multi-layered encoder generates encoding statistical information and ROI information, based on the result of performing encoding on a first layer (step S410). Processes of generating the encoding statistical information and the ROI information, based on the result of encoding the first layer are as described above.

Then, the multi-layered encoder determines target numbers of bits to be assigned to regions of the second layer, based on the encoding statistical information of the first layer (step S420). For example, the multi-layered encoder may determine target numbers of bits to be assigned to macroblocks and/or frames of the second layer, based on the encoding statistical information of the first layer corresponding to locations of macroblocks of the second layer that are to be encoded, according to Equations 1 to 4. In Equations 1 to 4, the base layer corresponds to the first layer and the enhancement layer corresponds to the second layer.

Then, the multi-layered encoder assigns quantization parameters to the regions of the second layer, based on the ROI information generated at the first layer (step S430). For example, a macroblock of the first layer corresponding to a macroblock of the second layer, which is to be encoded, may be detected, and a quantization parameter may be assigned to the macroblock of the second layer, which is to be encoded, based on the ROI information about the detected macroblock of the first layer.

Then, the multi-layered encoder performs encoding on the second layer by using the target number of bits and quantization parameters that are respectively determined for the regions of the second layer (step S440). Then, the multi-layered encoder adjusts the quantization parameter assigned in step S430, according to the target number of bits determined for the macroblocks and/or frames of the second layer and numbers of bits that are actually generated when the second layer is entropy coded. For example, a quantization parameter assigned to a subsequent macroblock to be processed is reduced if the target numbers of bits determined based on the encoding statistical information of the base layer are greater than the actually generated numbers of bits, and is increased if the target numbers of bits determined based on the encoding statistical information of the base layer are less than the actually generated numbers of bits. The quantization parameter assigned to the subsequent macroblock is maintained if the target numbers of bits determined based on the encoding statistical information of the base layer are equal to the actually generated numbers of bits. As described above, the multi-layered encoder quantizes residual transformation coefficients generated when the second layer is encoded, by adjusting the assigned quantization parameters.

Figure 27:
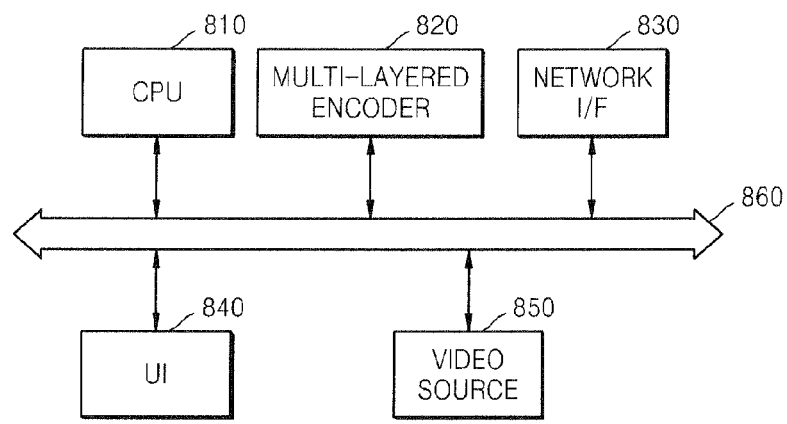
FIG. 27 is a block diagram of a video providing apparatus according to an exemplary embodiment of the inventive concept.

FIG. 27 is a block diagram of a video providing apparatus 2000 according to an exemplary embodiment of the inventive concept. Referring to FIG. 27, the video providing apparatus 2000 includes a central processing unit (CPU) 810, a multi-layered encoder 820, a network interface (I/F) 830, a user interface (UI) 840, a video source 850, and a bus 860.

The bus 860 is a transmission line and system bus via which data or control signals are exchanged between constitutional elements of the video providing apparatus 2000.

The video source 850 is a video capturing device, e.g., a video camera, a content providing device, a camera phone, a video phone, a mobile phone with a built-in camera, or the like.

The multi-layered encoder 820 may be the video encoder 120 illustrated in FIG. 2.

The network I/F 830 may include software and/or hardware for transmitting a base layer and/or enhancement layer bitstream, which is encoded by the multi-layered encoder 820, to a target device via a wired/wireless communication channel.

The user interface UI 840 is a device via which a control signal for controlling an operation of the CPU 810 or data that is to be processed by the CPU 810 is input. The UI 840 may be embodied as a touch pad, a mouse, a keypad, or a keyboard.

Figure 28:
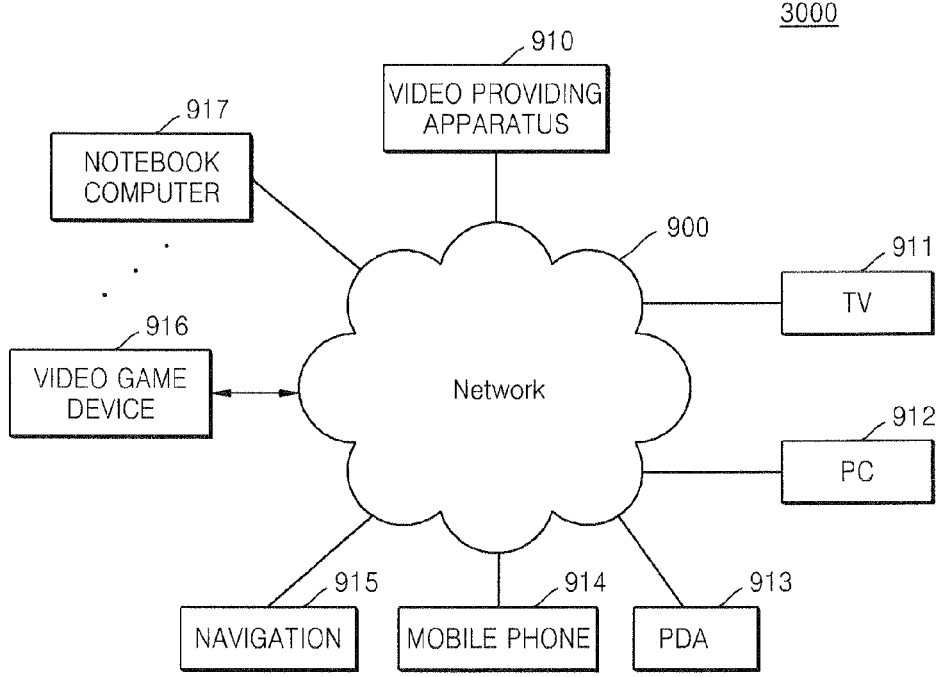
FIG. 28 is a block diagram of a video service system according to an exemplary embodiment of the inventive concept.

FIG. 28 is a block diagram of a video service system 3000 according to an exemplary embodiment of the inventive concept. Referring to FIG. 28, the video service system 3000 includes a network 900, a video providing apparatus 910, and at least one target device, e.g., target devices 911 to 917, that are connected to the network 900.

The network 900 may be embodied as a wired/wireless communication network.

The video providing apparatus 910 may be the video providing apparatus of FIG. 28.

The target devices 911 to 917 may be a television (TV) 911, a personal computer (PC) 912, a personal digital assistant (PDA) 913, a mobile phone 914, a navigation 915, a video game device 916, and a notebook computer 917, but are not limited thereto and may be any of other various devices capable of receiving and decoding digital video data.

While the inventive concept has been particularly shown and described with reference to exemplary embodiments thereof, it will be understood that various changes in form and details may be made therein without departing from the spirit and scope of the following claims.

What is claimed is:

1. A rate control method for multi-layered video coding, the method comprising:
    receiving as inputs different first and second target bit rates, and video data;
    encoding the input video data at a first layer for the first target bit rate;
    generating encoding statistical information based on the result of encoding input video data at the first layer;
    determining target numbers of bits to be respectively assigned to regions of a second layer, based on the encoding statistical information; and
    encoding the input video data at the second layer for the second target bit rate, based on the target numbers of bits, wherein the second target bit rate is greater than the first target bit rate.

2. The rate control method of claim 1, wherein the regions of the second layer are dimensioned as at least one from among a group consisting of pictures (GOP), frames, or macroblocks.

3. The rate control method of claim 1, wherein the encoding statistical information comprises information about the number of bits generated when encoding is performed in units of regions at the first layer.

4. The rate control method of claim 1, wherein the encoding statistical information comprises information about the sum of absolute differences (SAD) between pixel values of the current frame and a predicted frame, that are calculated in units of the regions of the first layer during the encoding of the first layer.

5. The rate control method of claim 1, wherein the encoding statistical information comprises information about complexities calculated in units of the regions of the first layer.

6. The rate control method of claim 1, wherein the encoding statistical information comprises at least two from among:
    information about numbers of bits generated in units of the first layer during the encoding of the first layer,
    information about the sum of absolute differences (SAD) between pixel values of a current frame and a predicted frame calculated in units of the regions of the first layer, and
    information about complexities calculated in units of the regions of the first layer.

7. The rate control method of claim 1, wherein, if the spatial resolution of the video data to be encoded at the first layer is different from the spatial resolution of the video data o be encoded at the second layer, then the target numbers of bits to be assigned to the regions of the second layer are determined based on the result of up scaling or down scaling the encoding statistical information so as to control the encoded spatial resolutions to be the same.

8. The rate control method of claim 1, wherein a target number of bits that are to be assigned to the current macroblock of the second layer is determined based on the numbers of bits generated when the macroblocks of the first layer corresponding to the location of the current macroblock of the second layer are encoded.

9. The rate control method of claim 1, wherein target numbers of bits that are to be respectively assigned to macroblocks of the second layer are determined based on the sum of absolute differences (SAD) calculated between pixel values of a current frame and a predicted frame in macroblocks of the first layer that match the macroblocks of the second layer.

10. The rate control method of claim 1, wherein target numbers of bits that are to be assigned to macroblocks of the second layer are determined based on:
the numbers of bits generated when macroblocks of the first layer that match the macroblocks of the second layer are encoded; and
the sum of absolute differences (SAD) between pixel values calculated in the macroblocks of the first layer that match the macroblocks of the second layer.

11. The rate control method of claim 1, wherein target numbers of bits that are to be respectively assigned to frames of the second layer are determined, based on at least one from among information about complexities calculated in units of the regions of the first layer and frame bit occupancy information of a group of pictures (GOP) of the first layer.

12. The rate control method of claim 1, wherein the encoding of the input video data at the second layer comprises determining quantization parameters based on the target numbers of bits, and performs quantization by using the quantization parameters during the encoding of the input video data at the second layer.

13. The rate control method of claim 12, wherein the quantization parameters are determined by adjusting parameters assigned to the regions of the second layer, according to:
the differences between the target numbers of bits assigned to the regions of the second layer, and
the numbers of bits generated during the encoding of the second layer.

14. The rate control method of claim 1, further comprising:
generating region-of-interest (ROI) information about the input video data; and
determining the quantization parameters assigned related to the input video data in units of the regions of the second layer, based on the ROI information.

15. A video encoding apparatus comprising:
a first encoding processor for encoding input video data at a first layer for an input first target bit rate and configured to generate encoding statistical information, based on the result of encoding input video data at the first layer; and
a second rate controller for generating second quantization parameters to be used when encoding is performed on a second layer for an input second target bit rate different from the first target bit rate, based on the encoding statistical information,
wherein the second rate controller comprises a number-of-bits determination unit for determining target numbers of bits to be respectively assigned to regions of the second layer, based on the encoding statistical information, and a quantization parameter generation unit for generating the quantization parameters, based on the differences between the target numbers of bits and numbers of bits generated by the second encoding processor.

16. The video encoding apparatus of claim 15, wherein the encoding statistical information comprises at least one from among:

information about numbers of bits generated when encoding is performed in units of regions of the first layer,
information about the sum of absolute differences (SAD) between pixel values of a current frame and a predicted frame calculated in units of the regions of the first layer, and
information about complexities of the regions of the first layer.

17. The video encoding apparatus of claim 15, wherein the number-of-bits determination unit determines target numbers of bits to be respectively assigned to macroblocks of the second layer, based on numbers of bits generated when macroblocks of the first layer that match the macroblocks of the second layer are encoded.

18. The video encoding apparatus of claim 15, wherein the number-of-bits determination unit determines target numbers of bits to be respectively assigned to macroblocks of the second layer, based on the SAD (sum of absolute differences) calculated between pixel values of a current frame and a predicted frame in macroblocks of the first layer that match the macroblocks of the second layer.

19. The video encoding apparatus of claim 15, wherein the number-of-bits determination unit determines target numbers of bits to be respectively assigned to macroblocks of the second layer, based on at least one from among:
information about complexities of regions of the first layer calculated at the first layer, and
frame bit occupancy information of a group of pictures (GOP) of the first layer.

20. The video encoding apparatus of claim 15, further comprising a region-of-interest (ROI) detection unit for detecting a region of interest of the input video data, and generating ROI information indicating the detected region of interest, and
wherein the rate controller determines the quantization parameters to be assigned to regions of the second layer, based on the ROI information.

21. A video signal processing system comprising:
a multi-layered encoder for encoding source video data on a base layer for an input first target bit rate and at least one enhancement layer for an input second target bit rate different from the first target bit rate; and
a transmitter for transmitting the source video data encoded by the multi-layered encoder to a target device via a wired or wireless network using each of the first target bit rate and the second target bit rate at different times, respectively, as network conditions vary,
wherein the multi-layered encoder determines target numbers of bits to be assigned to regions in one frame of the at least one enhancement layer, based on encoding statistical information generated according to the result of encoding the source video data encoded at the base layer.

22. The video signal processing system of claim 21, wherein the multi-layered encoder determines quantization parameters to be assigned to the regions of the at least one enhancement layer, based on region-of-interest (ROI) information about the source video data.

23. A video encoding apparatus comprising:
a first encoding processor for encoding input video data at a first layer for an input first target bit rate and configured to generate encoding statistical information based on the result of encoding input video data at the first layer;
a buffer for storing the encoding statistical information; and
a second rate controller for generating a second quantization parameter for each current macroblock, based on the encoding statistical information, for encoding at a second layer for an input second target bit rate different from the first target bit rate, wherein the second rate controller comprises a number-of-bits determination unit for determining target numbers of bits to be respectively assigned to regions of the second layer, based on the encoding statistical information, and a quantization parameter generation unit for generating the quantization parameters, based on the differences between the target numbers of bits and numbers of bits generated by the second encoding processor.

24. The video encoding apparatus of claim 15, further comprising a second encoding processor for encoding the input video data at the second layer by using the second quantization parameters.

25. The video encoding apparatus of claim 15, further comprising a first rate controller for generating a first quantization parameter for encoding at the first layer.

* * * * *